(12) United States Patent
Dally et al.

(10) Patent No.: US 10,891,538 B2
(45) Date of Patent: Jan. 12, 2021

(54) SPARSE CONVOLUTIONAL NEURAL NETWORK ACCELERATOR

(71) Applicant: NVIDIA Corporation, Santa Clara, CA (US)

(72) Inventors: William J. Dally, Los Altos Hills, CA (US); Angshuman Parashar, Northborough, MA (US); Joel Springer Emer, Acton, MA (US); Stephen William Keckler, Austin, TX (US); Larry Robert Dennison, Mendon, MA (US)

(73) Assignee: NVIDIA Corporation, Santa Ciara (CA)

( * ) Notice: Subject to any disclaimer, the term of this patent is extended or adjusted under 35 U.S.C. 154(b) by 841 days.

(21) Appl. No.: 15/659,371

(22) Filed: Jul. 25, 2017

(65) Prior Publication Data

US 2018/0046900 A1 Feb. 15, 2018

Related U.S. Application Data

(63) Continuation-in-part of application No. 15/458,799, filed on Mar. 14, 2017, now Pat. No. 10,528,864, (Continued)

(51) Int. Cl.
*G06N 3/04* (2006.01)
*G06F 17/11* (2006.01)
(Continued)

(52) U.S. Cl.
CPC ......... *G06N 3/0427* (2013.01); *G06F 9/3001* (2013.01); *G06F 9/30018* (2013.01);
(Continued)

(58) Field of Classification Search
CPC .. G06F 17/11; G06F 17/16; G06F 9/28; G06F 9/3001; G06F 9/30018;
(Continued)

(56) References Cited

U.S. PATENT DOCUMENTS

| 7,877,524 B1 | 1/2011 | Annem et al. |
| 2014/0023286 A1 | 1/2014 | Du |

(Continued)

OTHER PUBLICATIONS

Merkl, Frank J., "Binary image compression using run length encoding and multiple scanning techniques," (1988). Thesis. Rochester Institute of Technology, 1988.
(Continued)

*Primary Examiner* — Kamran Afshar
*Assistant Examiner* — Brent Johnston Hoover
(74) *Attorney, Agent, or Firm* — Leydig, Voit & Mayer, Ltd.

(57) ABSTRACT

A method, computer program product, and system perform computations using a processor. A first instruction including a first index vector operand and a second index vector operand is received and the first index vector operand is decoded to produce first coordinate sets for a first array, each first coordinate set including at least a first coordinate and a second coordinate of a position of a non-zero element in the first array. The second index vector operand is decoded to produce second coordinate sets for a second array, each second coordinate set including at least a third coordinate and a fourth coordinate of a position of a non-zero element in the second array. The first coordinate sets are summed with the second coordinate sets to produce output coordinate sets and the output coordinate sets are converted into a set of linear indices.

20 Claims, 20 Drawing Sheets

Related U.S. Application Data which is a continuation-in-part of application No. 15/458,837, filed on Mar. 14, 2017.

(60) Provisional application No. 62/373,919, filed on Aug. 11, 2016.

(51) Int. Cl.
| | | |
|---|---|---|
| *G06F 9/30* | (2018.01) | |
| *G06F 9/38* | (2018.01) | |
| *G06N 3/08* | (2006.01) | |
| *G06N 3/063* | (2006.01) | |
| *G06F 9/355* | (2018.01) | |
| *G06F 17/16* | (2006.01) | |
| *G06F 9/28* | (2006.01) | |

(52) U.S. Cl.
CPC ...... *G06F 9/30025* (2013.01); *G06F 9/30036* (2013.01); *G06F 9/3851* (2013.01); *G06F 9/3887* (2013.01); *G06F 17/11* (2013.01); *G06N 3/0454* (2013.01); *G06N 3/063* (2013.01); *G06N 3/082* (2013.01); *G06F 9/28* (2013.01); *G06F 9/3555* (2013.01); *G06F 17/16* (2013.01)

(58) Field of Classification Search
CPC ............ G06F 9/30025; G06F 9/30036; G06F 9/3555; G06F 9/3851; G06F 9/3887; G06N 3/0427; G06N 3/0454; G06N 3/063; G06N 3/082
See application file for complete search history.

(56) References Cited

U.S. PATENT DOCUMENTS

| | | |
|---|---|---|
| 2016/0379109 A1 | 12/2016 | Chung et al. |
| 2017/0011288 A1 | 1/2017 | Brothers |
| 2018/0032312 A1 | 2/2018 | Hansen et al. |
| 2018/0046895 A1 | 2/2018 | Xie et al. |
| 2019/0205740 A1* | 7/2019 | Judd .................. G06N 3/084 |

OTHER PUBLICATIONS

Han, et al., "Learning Both Weights and Connections for Efficient Neural Networks," arXiv, Jun. 8, 2015, pp. 1-8 (2015).
Liu, et al., "Sparse Convolutional Neural Networks," CVPR2015 paper, IEEE Xplore, pp. 806-814, (2015).
Albericio et al., "Cnvlutin: Ineffectual-Neuron-Free Deep Convolutional Neural Network Computing," In Proceedings of the International Symposium on Computer Architecture (ISCA), Jun. 2016, pp. 1-13.
Chen, et al., "DianNao: A Small-footprint High-throughput Accelerator for Ubiquitous Machine-Learning," In Proceedings of the International Conference on Architectural Support for Programming Languages and Operation Systems (ASPLOS), Mar. 2014, pp. 269-283.
Chen, et al., "Eyeriss: A Spatial Architecture for Energy-Efficient Dataflow for Convolutional Neural Networks," In Proceedings of the International Symposium on Computer Architecture (ISCA), Jun. 2016, pp. 367-379.
Chen, et al., "Eyeriss: An Energy-efficient Reconfigurable Accelerator for Deep Convolutional Neural Networks," In Proceedings of the International Solid State Circuits Conference (ISSCC), Feb. 2016, pp. 1-3.
Han et al., "EIE: Efficient Inference Engine on Compressed Deep Neural Network," In Proceedings of the International Symposium on Computer Architecture (ISCA), Jun. 2016, pp. 1-12.
Reagen et al., "Minerva: Enabling Low-Power, High-Accuracy Deep Neural Network," In Proceedings of the International Symposium on Computer Architecture (ISCA), Jun. 2016, pp. 1-12.
Zhang, et al., "Cambricon-X: An Accelerator for Sparse Neural Networks," In Proceedings of the International Symposium on Microarchitecture (MICRO), Oct. 2016, pp. 1-12.
U.S. Appl. No. 15/458,837, filed Mar. 14, 2017.
U.S. Appl. No. 15/458,799, filed Mar. 14, 2017.
U.S. Appl. No. 16/686,931, filed Nov. 18, 2019.

* cited by examiner $(2,0,0),(0,1,0),(1,2,0),(0,1,1),(2,1,1),(1,2,1)$

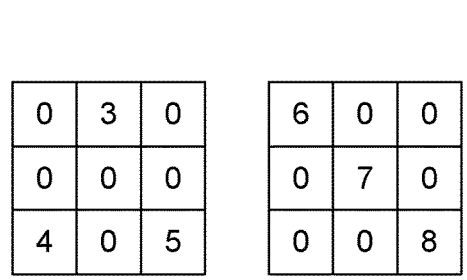
Fig. 4B
| Code | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| Weight | R0 | R1 | R2 | R3 | R4 | R5 | R6 | R7 | R8 | R10 | S0 | S1 | S2 | S3 | K0 | K1 |
| IA | X0 | X1 | X2 | X3 | X4 | X5 | X6 | X7 | X8 | X10 | Y16 | X24 | Y0 | Y1 | Y2 | Y3 |
Fig. 4C
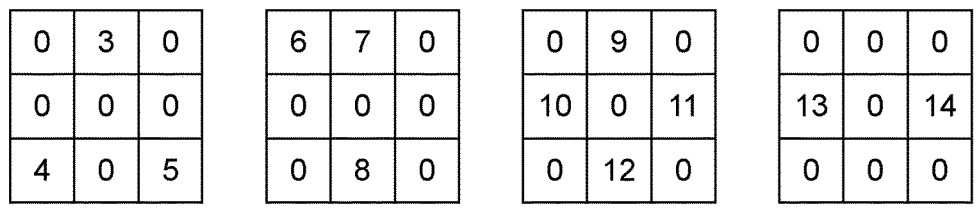
Fig. 4D
| S1 | S4 | S1 | S0 | S0 | S5 | S2 | S1 | S1 | S1 | S4 | S1 |
|---|---|---|---|---|---|---|---|---|---|---|---|
| 1,0,0 | 0,2,0 | 2,2,0 | 0,0,1 | 1,0,1 | 1,2,1 | 1,0,2 | 0,1,2 | 2,1,2 | 1,2,2 | 0,1,3 | 2,1,3 |
Fig. 4E

505

| code  | 0  | 1  | 2  | 3  | 4  | 5  | 6  | 7  | 8   | 9   | 10  | 11  | 12  | 13  | 14  | 15   |
|-------|----|----|----|----|----|----|----|----|-----|-----|-----|-----|-----|-----|-----|------|
| value | R0 | R1 | R2 | R3 | R4 | R5 | R6 | R7 | R12 | R16 | R24 | R32 | R48 | R64 | R96 | R128 |

| code  | 0  | 1  | 2  | 3  | 4  | 5  | 6  | 7  | 8  | 9  | 10 | 11 | 12 | 13 | 14 | 15 |
|-------|----|----|----|----|----|----|----|----|----|----|----|----|----|----|----|----|
| value | R0 | R1 | R2 | R3 | R4 | R5 | R6 | R7 | Y0 | Y1 | Y2 | Y3 | Y4 | Y5 | Y6 | Y7 |

| code  | 0  | 1  | 2  | 3  | 4  | 5  | 6  | 7  | 8  | 9  | 10  | 11 | 12 | 13 | 14 | 15 |
|-------|----|----|----|----|----|----|----|----|----|----|-----|----|----|----|----|----|
| value | R0 | R1 | R2 | R3 | R4 | R5 | R6 | R7 | R8 | R9 | R10 | Y0 | Y1 | Y2 | Y3 | Y4 |

| code  | 0  | 1  | 2  | 3  | 4  | 5  | 6  | 7  | 8  | 9  | 10  | 11  | 12  | 13  | 14 | 15 |
|-------|----|----|----|----|----|----|----|----|----|----|-----|-----|-----|-----|----|----|
| value | R0 | R1 | R2 | R3 | R4 | R5 | R6 | R7 | R8 | R9 | R10 | R11 | R12 | R13 | K0 | K1 |

| code  | 0  | 1  | 2  | 3  | 4  | 5  | 6  | 7  | 8  | 9  | 10 | 11 | 12 | 13 | 14 | 15 |
|-------|----|----|----|----|----|----|----|----|----|----|----|----|----|----|----|----|
| value | R0 | R1 | R2 | R3 | R4 | R5 | R6 | R7 | R8 | R9 | S0 | S1 | S2 | S3 | K0 | K1 |

*Fig. 5E*

SPARSE CONVOLUTIONAL NEURAL NETWORK ACCELERATOR

CLAIM OF PRIORITY

This application claims the benefit of U.S. Provisional Application No. 62/373,919 titled "Sparse Convolutional Neural Network Accelerator," filed Aug. 11, 2016, the entire contents of which is incorporated herein by reference. This application is a continuation-in-part of U.S. application Ser. No. 15/458,799 and Ser. No. 15/458,837 both titled "Sparse Convolutional Neural Network Accelerator," and filed Mar. 14, 2017, the entire contents of which are incorporated herein by reference.

FIELD OF THE INVENTION

The present invention relates to convolutional neural networks, and more particularly to primitive operations of a sparse convolutional neural network accelerator.

BACKGROUND

Driven by the availability of massive data and the computational capability to process it, deep learning has recently emerged as a critical tool for solving complex problems across a wide range of domains, including image recognition, speech processing, natural language processing, language translation, and autonomous vehicles. Convolutional neural networks (CNNs) have become the most popular algorithmic approach for deep learning for many of these domains. High performance and extreme energy efficiency are critical for deployments of CNNs in a wide range of situations, especially mobile platforms such as autonomous vehicles, cameras, and electronic personal assistants.

Employing CNNs can be decomposed into two tasks: (1) training—in which the parameters of a neural network are learned by observing massive numbers of training examples, and (2) classification—in which a trained neural network is deployed in the field and classifies the observed data. Today, training is often done on graphics processing units (GPUs) or farms of GPUs, while classification depends on the application and can employ central processing units (CPUs), GPUs, field-programmable gate arrays (FPGAs), or application-specific integrated circuits (ASICs).

During the training process, a deep learning expert will typically architect the network, establishing the number of layers in the neural network, the operation performed by each layer, and the connectivity between layers. Many layers have parameters, typically filter weights, that determine exact computation performed by the layer. The objective of the training process is to learn the filter weights, usually via a stochastic gradient descent-based excursion through the space of weights. The training process typically employs a forward-propagation calculation for each training example, a measurement of the error between the computed and desired output, and then back-propagation through the network to update the weights. Inference has similarities, but only includes the forward-propagation calculation. Nonetheless, the computation requirements for inference can be prohibitively large, particularly with the emergence of deeper networks (hundreds of layers) and larger inputs sets, such as high-definition video. Furthermore, the energy efficiency of this computation is important, especially for mobile platforms, such as autonomous vehicles, cameras, and electronic personal assistants. The computation requirements and energy consumption of a neural network for machine learning presents challenges for mobile platforms. Thus, there is a need for addressing these issues and/or other issues associated with the prior art.

SUMMARY

A method, computer program product, and system perform computations using a processor. A first instruction including a first index vector operand and a second index vector operand is received and the first index vector operand is decoded to produce first coordinate sets for a first array, each first coordinate set including at least a first coordinate and a second coordinate of a position of a non-zero element in the first array. The second index vector operand is decoded to produce second coordinate sets for a second array, each second coordinate set including at least a third coordinate and a fourth coordinate of a position of a non-zero element in the second array. The first coordinate sets are summed with the second coordinate sets to produce output coordinate sets and the output coordinate sets are converted into a set of linear indices.

BRIEF DESCRIPTION OF THE DRAWINGS

FIG. 4B illustrates a tile of weight values for two output channels, in accordance with one embodiment;

FIG. 4C illustrates a coding scheme for weights and input activations (IA), in accordance with one embodiment;

FIG. 4D illustrates weight values for four 3×3 convolution kernels, in accordance with one embodiment;

FIG. 4E illustrates an encoding of the positions for the weight values in the four 3×3 convolution kernels shown in FIG. 4D, in accordance with one embodiment;

FIG. 5A illustrates a non-linear coding scheme for input activation zero-count values, in accordance with one embodiment;

FIG. 5B illustrates another coding scheme for input activation zero-count values, in accordance with one embodiment;

FIG. 5C illustrates another coding scheme for input activation zero-count values, in accordance with one embodiment;

FIG. 5D illustrates another coding scheme for weight zero-count values, in accordance with one embodiment;

FIG. 5E illustrates another coding scheme for weight zero-count values, in accordance with one embodiment;

DETAILED DESCRIPTION

Neural networks typically have significant redundancy and can be pruned dramatically during training without substantively affecting accuracy of the neural network. The number of weights that can be eliminated varies widely across the layers of the neural network, but typically ranges from 20% to 80% Eliminating weights results in a neural network with a substantial number of zero values, which can potentially reduce the computational requirements of inference.

The inference computation also offers a further optimization opportunity. In particular, many neural networks employ the rectified linear unit (ReLU) function that clamps all negative activation values to zero as a non-linear operator. The activations are the output values of an individual layer that are passed as inputs to the next layer. For typical data sets, 50-70% of the activations are clamped to zero. Since the multiplication of weights and activations is the key computation for inference, the combination of activations that are zero and weights that are zero can reduce the amount of computation required by over an order of magnitude. A sparse CNN (SCNN) accelerator architecture described herein, exploits weight and/or activation sparsity to reduce energy consumption and improve processing throughput. The SCNN accelerator architecture couples an algorithmic dataflow that eliminates all multiplications with a zero operand while employing a compressed representation of both weights and activations through almost the entire computation. In one embodiment, each non-zero weight and activation value is represented by a (value, position) pair.

Additional benefits can be achieved by a compressed or compact encoding for sparse weights and/or activations that include several zeros, thus allowing more weight and/or activation values to fit in on-chip random access memory (RAM) and reducing the number of energy-costly dynamic random access memory (DRAM) accesses to read activations and weights. Furthermore, transmitting the compact encoding may reduce the number of transitions on buses, further reducing energy consumption. Finally, only the non-zero elements of weights and input activations are provided as operands to the multipliers, ensuring that each multiplier within a processing element (PE) generates a product that affects an output activation value. In the context of the following description, activation refers to an input activation and/or an output activation. In the context of the following description, the weight and activation values are multi-bit values representing zero, positive values, or negative values. In the context of the following description, the positions are coordinates in an N dimensional space.

Figure 1:
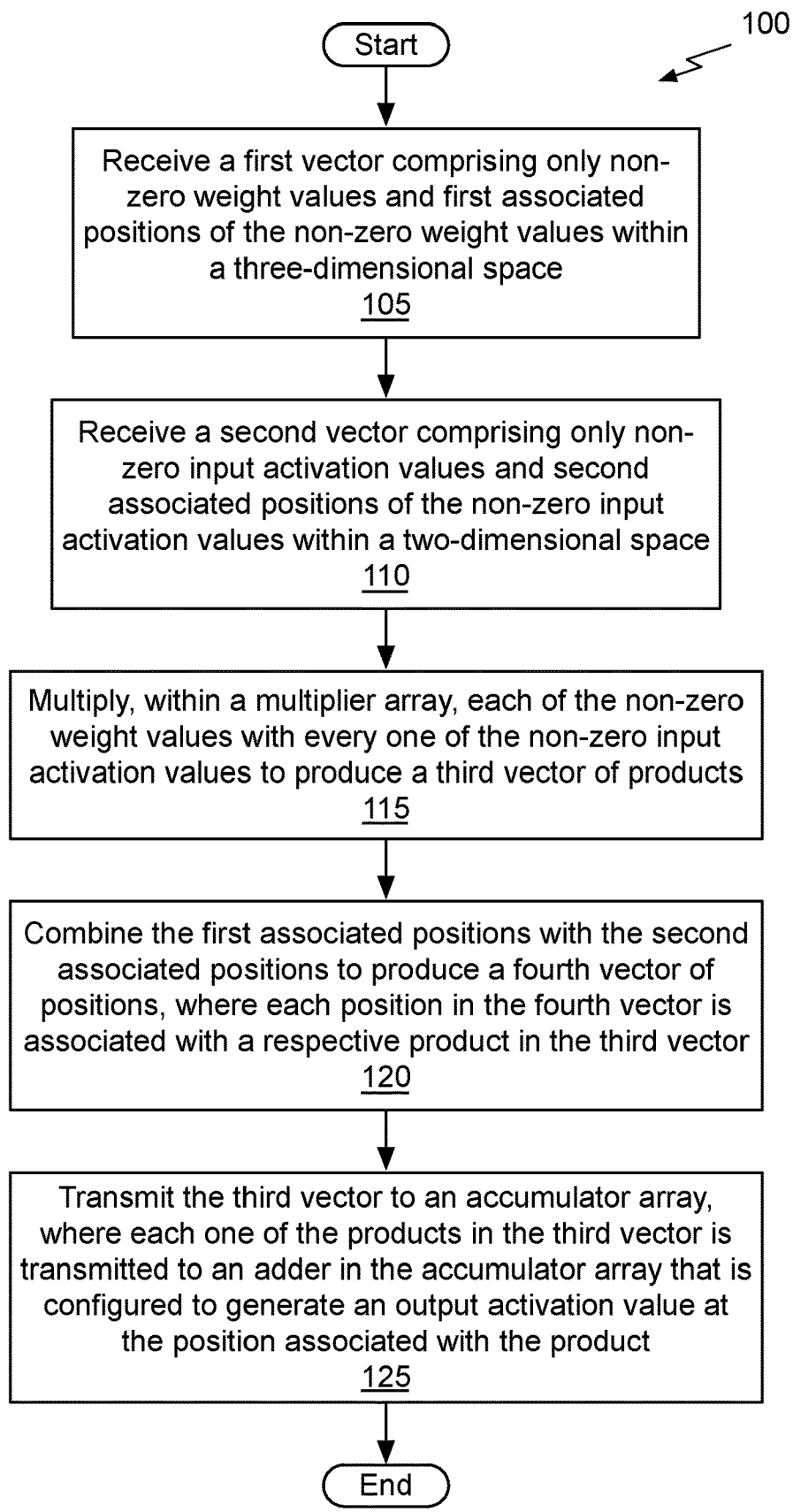
FIG. 1 illustrates a flowchart of a method for performing computations using a Sparse Convolutional Neural Network (SCNN) Accelerator, in accordance with one embodiment.

FIG. 1 illustrates a flowchart of a method 100 for performing computations using a SCNN accelerator, in accordance with one embodiment. Although method 100 is described in the context of a processing element within a SCNN accelerator, the method 100 may also be performed by a program, custom circuitry, or by a combination of custom circuitry and a program. Furthermore, persons of ordinary skill in the art will understand that any system that performs method 100 is within the scope and spirit of embodiments of the present invention.

At step 105, a first vector comprising only non-zero weight values and first associated positions of the non-zero weight values within a three-dimensional (3D) space are received. In one embodiment, the first vector is received from a memory. In one embodiment, the first vector is received by a processing element (PE) within a SCNN accelerator, such as the SCNN accelerator 200 described in conjunction with FIG. 2A.

At step 110, a second vector comprising only non-zero input activation values and second associated positions of the non-zero input activation values within a two-dimensional (2D) space are received. In one embodiment, the second vector is received from a memory. In one embodiment, the second vector is received by a PE within a SCNN accelerator, such as the SCNN accelerator 200 described in conjunction with FIG. 2A. In one embodiment, the second vector is generated by the SCNN accelerator 200 during processing of a previous layer of a neural network.

At step 115, each one of the non-zero weight values is multiplied with every one of the non-zero input activation values, within a multiplier array, to produce a third vector of products. At step 120, the first associated positions are combined with the second associated positions to produce a fourth vector of positions, where each position in the fourth vector is associated with a respective product in the third vector. In one embodiment, the combining comprises performing a vector addition to sum coordinates in the first associated positions with the second associated positions to produce the fourth vector of positions, where each position in the fourth vector is associated with a respective product in the third vector.

At step 125, the third vector is transmitted to an accumulator array, where each one of the products in the third vector is transmitted to an adder in the accumulator array that is configured to generate an output activation value at the position associated with the product. In one embodiment, the third vector is transmitted through an array of buffers in the accumulator array, where each one of the buffers is coupled to an input of one of the adders in the accumulator array.

More illustrative information will now be set forth regarding various optional architectures and features with which the foregoing framework may or may not be implemented, per the desires of the user. It should be strongly noted that the following information is set forth for illustrative purposes and should not be construed as limiting in any manner.

Any of the following features may be optionally incorporated with or without the exclusion of other features described.

Sparse Convolutional Neural Network Accelerator

Figure 2A:
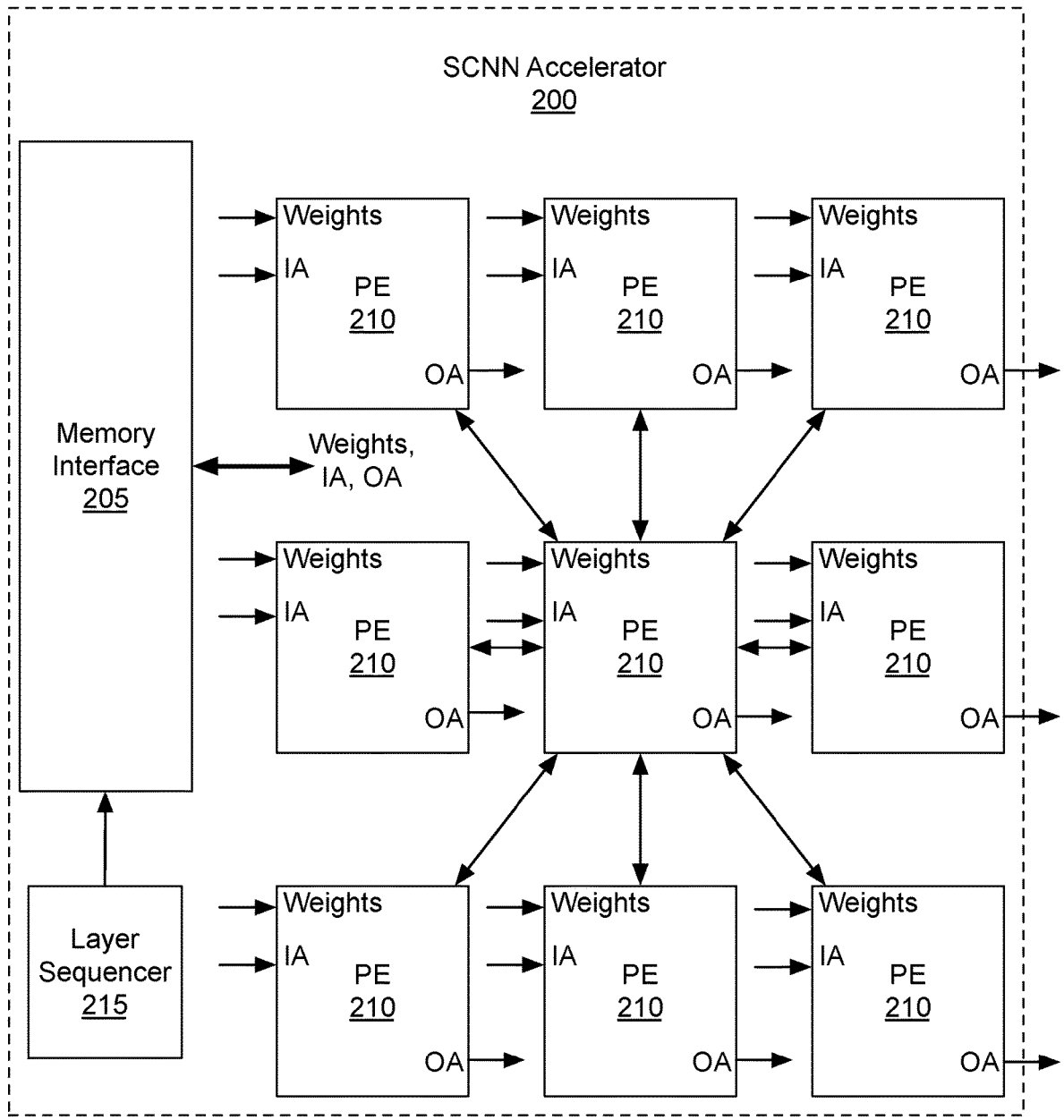
FIG. 2A illustrates a block diagram of a SCNN accelerator, in accordance with one embodiment.

FIG. 2A illustrates a block diagram of the SCNN 200, in accordance with one embodiment. SCNN 200 couples an algorithmic dataflow that eliminates all multiplications with a zero operand while transmitting a compact representation of weights and/or input activations between memory and logic blocks within the SCNN 200. The SCNN 200 includes a memory interface 205, layer sequencer 215, and an array of processing elements (PEs) 210. In one embodiment, the SCNN 200 is a processor and the PEs 210 are parallel processing units.

The memory interface 205 reads weight and activation data from a memory coupled to the SCNN 200 the memory interface 205 may also write weight and/or activation data from the SCNN 200 to the memory. In one embodiment, all of the activation data is stored within the PEs 210, so that only weight data is access through the memory interface 205. The weight and/or activation data may be stored in the memory in a compact format or an expanded format. The compact format may comprise vectors including only non-zero elements (weights or activations) and positions associated with the non-zero elements.

The memory may be implemented using dynamic random access memory (DRAM), or the like. In one embodiment, the memory interface 205 or the PEs 210 are configured to compact multi-bit data, such as the weights, input activations, and output activations. The layer sequencer 215 controls the reading of the memory to obtain the compact input activations and compact weights. The compact input activations and compact weights may be stored within the memory interface 205 before being transmitted to the PEs 210.

In one embodiment, the compact activations and the compact weights are data sequences encoded as non-zero elements and positions. In one embodiment, the non-zero elements and positions are each encoded as a (value, position) pair. If needed, the compact activations and compact weights may be expanded to generate data sequences of weights and activations that include multi-bit zero and non-zero elements. Importantly, when the weights and input activations are in compact form, only non-zero weights and input activations are transferred from the memory interface 205 to the PEs 210. In one embodiment, the non-zero elements are 8 bits and the positions are 4 bits. However, the non-zero elements may be more than 8 bits or fewer bits than 8 bits and the positions may be more than 4 bits or fewer than 4 bits.

The layer sequencer 215 reads the weights and outputs weight vectors to be multiplied by the PEs 210. In one embodiment, the weights are in compact form and are read from off-chip DRAM only once and stored within the SCNN accelerator 200. In one embodiment, the layer sequencer 215 broadcasts a weight vector to each PE 210 and sequences through multiple activation vectors before broadcasting another weight vector. In one embodiment, the layer sequencer 215 broadcasts an input activation vector to each PE 210 and sequences through multiple weight vectors before broadcasting another input activation vector. Products generated by the multipliers within each PE 210 are accumulated to produce intermediate values (e.g., partial sums) that become the output activations after one or more iterations. When the output activations for a neural network layer have been computed and stored in an output activation buffer, the layer sequencer 215 may proceed to process a next layer by applying the output activations as input activations.

Each PE 210 includes a multiplier array that accepts a vector of weights (weight vector) and a vector of input activations (activation vector), where each multiplier within the array is configured to generate a product from one input activation value in the activation vector and one weight in the weight vector. The weights and input activations in the vectors can all be multiplied by one another in the manner of a Cartesian product. For example, if the input vectors are a,b,c,d and p,q,r,s respectively, the output is a 16-vector with values a*p, a*q, a*r, a*s, b*p, b*q, b*r, b*s, c*p, c*q, c*r, c*s, d*p, d*q, d*r, and d*s.

Importantly, only non-zero weights and input activations are transmitted to the multiplier array within each PE 210. Additionally, the input activation vectors may be reused within each PE 210 in an input stationary fashion against a number of weight vectors to reduce data accesses. The products generated by the multipliers are then summed together to generate the partial sums and the output activations. However, because the zero values have been removed, the mapping of the products to accumulators may vary for each product that is generated within the multiplier array. For example, in a conventional implementation where the zero values are maintained, the products generated during a clock cycle may be summed together to produce a partial sum. In contrast, the products generated during a clock cycle within a PE 210 may not necessarily be summed together to produce a partial sum. Therefore, output coordinates associated with each multiplication are tracked within the PE 210 and an output position (defined by the output coordinates) and product are provided to a scatter accumulator array for summing. The scatter accumulator allows for transmission of any product to any adder, based on the output position associated with the product. In one embodiment, the PEs 210 are configured to perform convolution operations on the weights and input activations. Summing the products in the adders completes the convolution operation and generates the output activations.

The SCNN 200 may be configured to implement CNN algorithms that are a cascaded set of pattern recognition filters trained with supervision. A CNN consists of a series of layers, which include convolutional layers, non-linear scalar operator layers, and layers that downsample the intermediate data, for example by pooling. The convolutional layers represent the core of the CNN computation and are characterized by a set of filters that are usually 1×1 or 3×3, and occasionally 5×5 or larger. The values of these filters are the weights that are trained using a training set for the network. Some deep neural networks (DNNs) also include fully-connected layers, typically toward the end of the DNN. During classification, a new image (in the case of image recognition) is presented to the neural network, which classifies images into the training categories by computing in succession each of the layers in the neural network. The SCNN 200 accelerates the convolutional layers, receiving weights and input activations and generating output activations.

Sparsity in a layer of a CNN is defined as the fraction of zeros in the layer's weight and input activation matrices. The primary technique for creating weight sparsity is to prune the network during training. In one embodiment, any weight with an absolute value that is close to zero (e.g. below a defined threshold) is set to zero. The pruning process has the effect of removing weights from the filters, and sometimes even forcing an output activation to always equal zero. The remaining network may be retrained, to regain the accuracy lost through naïve pruning. The result is a smaller network with accuracy extremely close to the original network. The process can be iteratively repeated to reduce network size while maintaining accuracy.

Activation sparsity occurs dynamically during inference and is highly dependent on the data being processed. In one embodiment, activations having negative values are clamped to zero. In one embodiment, input activations having an absolute value below a defined threshold are set to zero.

In one embodiment, a compaction engine within the PE 210 sets output activations having an absolute value below a defined threshold to zero. If the activations are in a compacted format, the compaction engine reformats the activations as needed after setting one or more activations to zero to produce compacted activations. After completing computation of the output activations for a layer of a CNN, each element in the output activation matrices that is below a threshold value may be set to zero before the output activation data is passed to the next layer.

SCNN Calculation Dataflow

The core operation in a CNN layer is a two-dimensional sliding-window convolution of an R×S element filter over a W×H element input activation plane to produce a W×H element output activation plane. There can be multiple (C) input activation planes, which are referred to as input channels. A distinct filter is applied to each input activation channel, and the filter output for each of the C channels are accumulated together element-wise into a single output activation plane. Multiple filters (K) can be applied to the same body of input activations to produce K output channels of output activations. Finally, a batch of length N of groups of C channels of input activation planes can be applied to the same volume of filter weights.

Figure 2B:
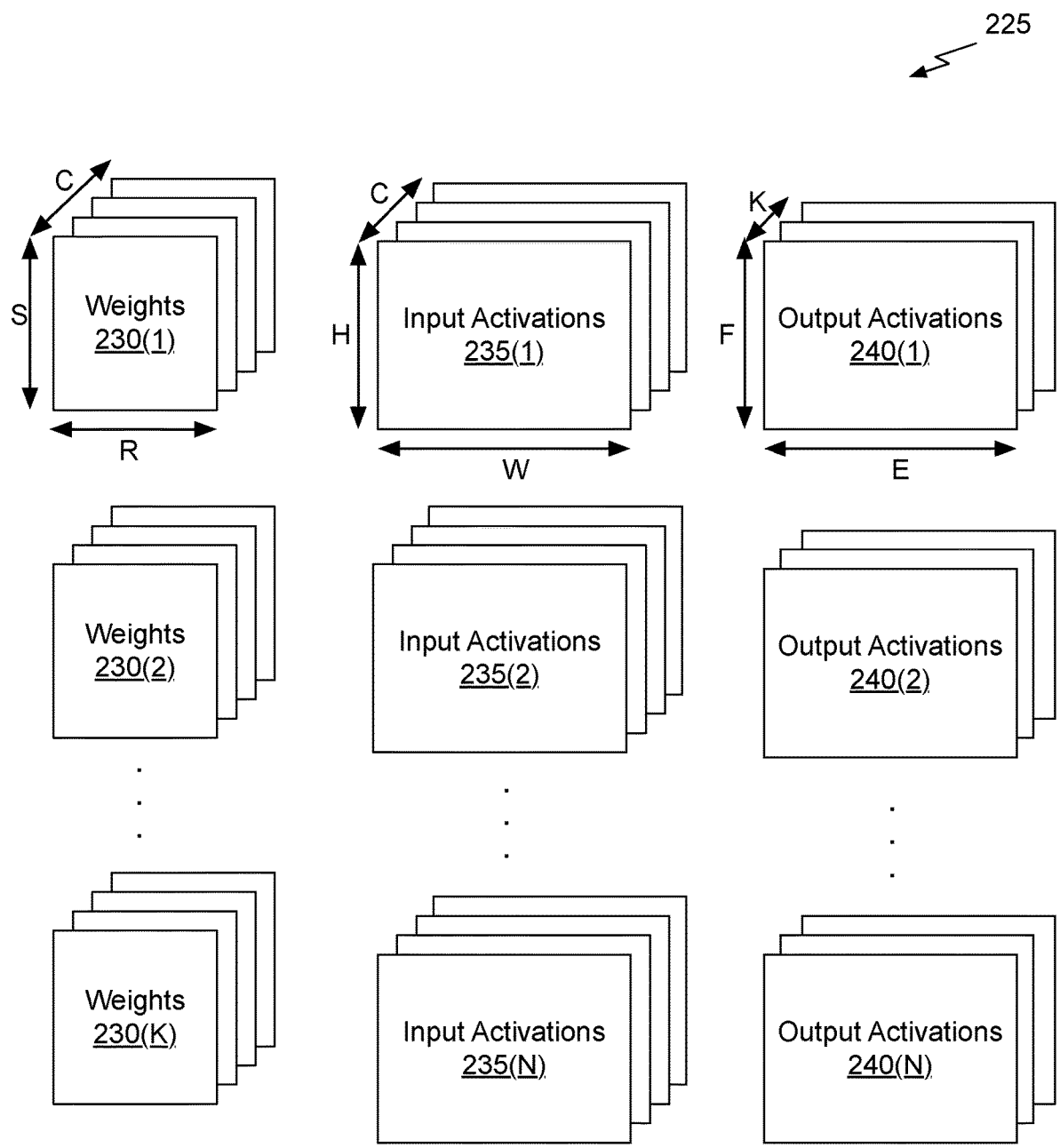
FIG. 2B illustrates a conceptual diagram of the organization of input activations and filter weights for processing by the SCNN accelerator shown in FIG. 2A, in accordance with one embodiment.

FIG. 2B illustrates input activations, weights, and output activations for a single CNN layer, in accordance with one embodiment. The set of computations for the complete layer can be formulated as a loop nest over the seven variables (N, K, C, W, H, R, and S). Because multiply-add operations are associative (modulo rounding errors, which are ignored in the context of the following description), all permutations of the seven loop variables are legal. TABLE 1 shows an example loop nest based on one such permutation. The nest may be concisely described as N→K→C→W→H→R→S. Each point in the seven-dimensional space formed from the variables represents a single multiply-accumulate operation. Note that for the remainder of the description, a batch size of 1 is assumed, which is a common batch size for inferencing tasks.

TABLE 1 seven dimensional CNN loop nest for n = 1 to N
  for k = 1 to K
    for c = 1 to C
      for x = 1 to W
        for y = 1 to H
          for r = 1 to R
            for s = 1 to S TABLE 1-continued seven dimensional CNN loop nest out[n][k][x][y] +=
  in[n][c][x+r−1][y+s−1] *
  filter[k][c][r][s];

The simple loop nest shown in TABLE 1 can be transformed in numerous ways to capture different reuse patterns of the activations and weights and to map the computation to a hardware accelerator implementation, such as the SCNN accelerator 200. A CNN's dataflow defines how the loops are ordered, partitioned, and parallelized and the choice of dataflow may have a significant impact on the area and energy-efficiency of an architecture.

While the concept of dataflow has been studied for dense architectures, sparse architectures can also employ various alternative dataflows, each with its own set of trade-offs. One such specific dataflow, described herein, is a sparse planar-tiled input-stationary (PTIS-sparse). PTIS-sparse enables reuse patterns that exploit the characteristics of sparse weights and activations. First, an equivalent dense dataflow (PTIS-dense) is described to explain the decomposition of the computations. Then, the specific features for PTIS-sparse are described.

Figure 2C:
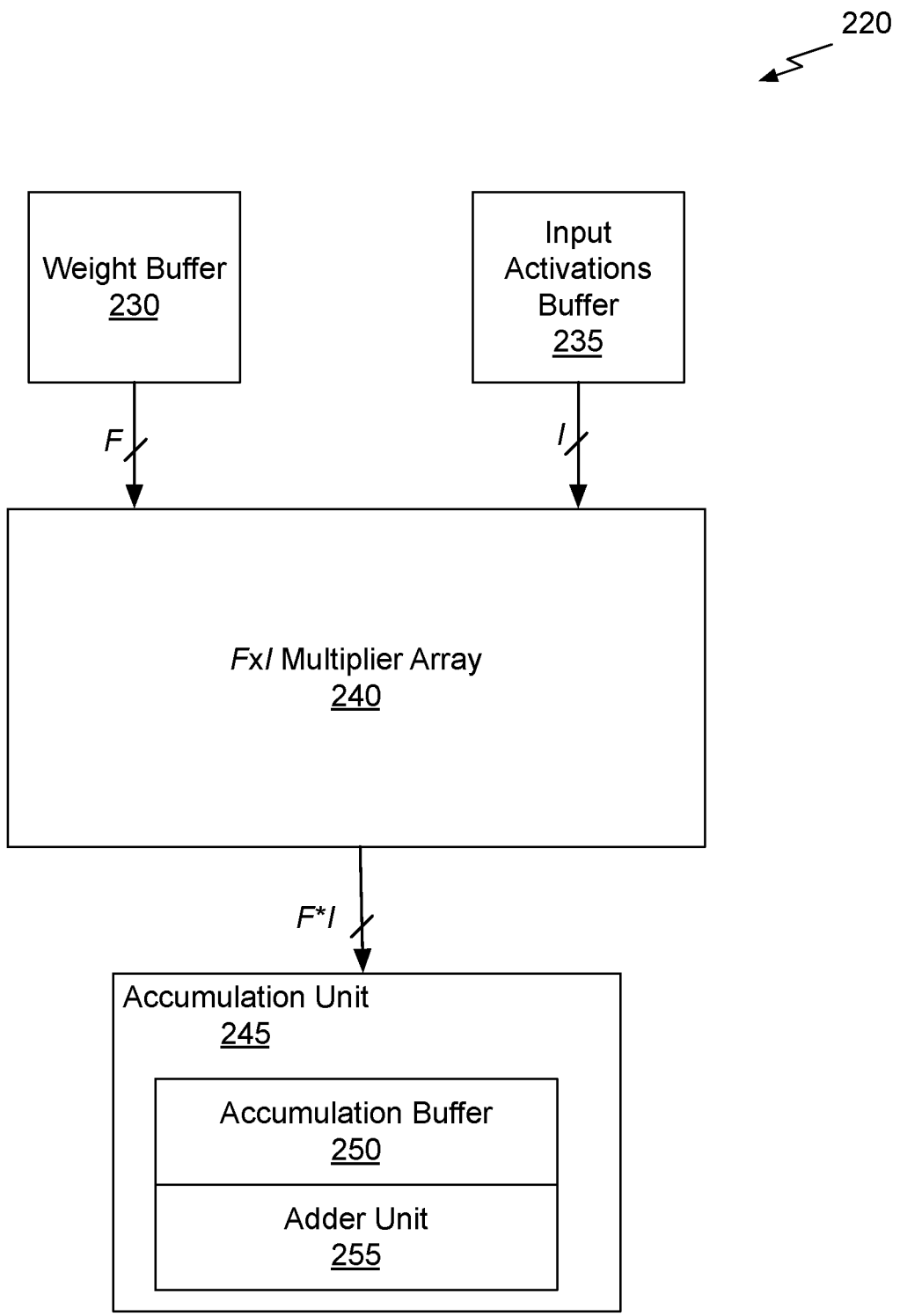
FIG. 2C illustrates a block diagram of a processing element, in accordance with one embodiment.

FIG. 2C illustrates a PE 220, in accordance with one embodiment. To understand the temporal component of the PTIS-dense dataflow, the operation of the PE 220 is described. PTIS employs an input-stationary computation order in which an input activation is held stationary at the computation units as the input activation is multiplied by all the filter weights needed to make all contributions of the input activation to each of the K output channels (a K×R×S subvolume). Thus, each input activation will contribute to a volume of K×R×S output activations. The input-stationary computation order maximizes the reuse of the input activations, while paying a cost to stream the weights to the PEs 220. Accommodating multiple input channels (C) adds an additional outer loop and results in the loop nest C→W→H→R→S.

The PTIS-dense dataflow relies on input buffers, weight buffer 230 and input activations buffer 235, for storing weights and input activations, respectively. An accumulator buffer 250 stores the partial sums of the output activations. A read-add-write operation is performed for every access to a previously-written partial sum in the accumulator buffer 250. The accumulator buffer 250 combined with an attached adder unit 255 forms an accumulation unit 245.

Parameters of contemporary networks cause the weight buffer 230 and input activations buffer 235 to be large and energy-expensive to access. The input-stationary temporal loop nest amortizes the energy cost of accessing the weight buffer 230 and input activations buffer 235 over multiple weight buffer 235 and accumulation buffer 250 accesses. More precisely, the register in which the stationary input is held over K×R×S iterations serves as an inner buffer, filtering accesses to the larger input buffer (e.g., weight buffer 230 or input activations buffer 235).

Unfortunately, the stationary feature of input activations comes at the cost of more accesses to the weights in the weight buffer 230 (or the memory) and partial sums in the accumulator buffer 250. Blocking the weights and partial sums in the output channel (K) dimension can increase reuse of the weight buffer 230 and accumulator buffer 250, improving energy efficiency. The output channel variable (K) may be factored into $K_c$ (called a output-channel group)

and $K/K_c$ is the number of output-channel groups. In one embodiment, only the weights and outputs for a single output-channel group are stored at a time inside the weight buffer 230 and the accumulation buffer 250. Thus, the sub-volumes that are housed in buffers at the computation unit are:

Weights: $K_c \times R \times S$
Input Activations: $C \times W \times H$
Partial Sums: $K_c \times W \times H$ An outer loop over all the $K/K_c$ output-channel tiles results in the complete loop nest $K/K_c \rightarrow C \rightarrow W \rightarrow H \rightarrow K_c \rightarrow R \rightarrow S$. Note that each iteration of the outer loop will require the weight buffer 230 to be refilled and the accumulation buffer 250 must be drained and cleared, while the contents of the input activations buffer 235 will be fully reused because the same input activations are used across all output channels.

To exploit the parallelism of many multipliers within a PE 220, a vector of F filter-weights may be fetched from the weight buffer 230 and a vector of I inputs may be fetched from the input activations buffer 235. The vectors are delivered to an array of F×I multipliers 240 to compute a full Cartesian product of output partial sums. Each product yields a useful partial sum such that no extraneous fetches or computations are performed. PTIS-sparse exploits this same property to perform efficient computations on compressed-sparse weights and input activations.

The multiplier outputs (e.g., products) are sent to the accumulation unit 245, which updates the partial sums stored in the accumulation buffer 250. Each product is accumulated with a partial sum at the output coordinates in the output activation space that matches (i.e., equals) a position associated with the product. The output positions for the products are computed in parallel with the products (not shown in FIG. 2C). In one embodiment, coordinates defining the output positions are computed by a state machine in the accumulation unit 245. The number of adders in the adder unit 255 does not necessarily equal the number of multipliers in the F×I multiplier array 240. However, the accumulation unit 245 must employ at least F×I adders in the adder unit 255 to match the throughput of the F×I multiplier array 240.

TABLE 2 shows pseudo-code for the PTIS-dense dataflow, including blocking in the K dimension (A,C), fetching vectors of input activations and weights (B,D), and computing the Cartesian product in parallel (E,F). Note that this PTIS-dense dataflow is simply a reordered, partitioned and parallelized version of the pseudo-code shown in TABLE 1.

TABLE 2 pseudo-code for the PTIS-dense dataflow

```
       BUFFER wt_buf[C][Kc][R][S/F][F];
       BUFFER in_buf[C][Wt][Ht/I][I];
       BUFFER acc_buf[Kc][Wt][Ht];
       BUFFER out_buf[K/Kc][Kc][Wt][Ht];
(A)    for k' = 1 to K/Kc
       {
         for c = 1 to C
           for x = 1 to Wt
             for y = 1 to Ht/I
             {
(B)            in[1:I] = in_buf[c][x][y][1:I];
(C)            for k = 1 to Kc
                 for r = 1 to R
                   for s = 1 to S/F
                   {
(D)                  wt[1:F] = wt_buf[c][k][r][s][1:F];
(E)                  parallel_for (i = 1 to I) * (f = 1 to F)
(F)                    acc_buf[k][x-r+1][y-s+1] += in[i]*wt[f];
```

TABLE 2-continued pseudo-code for the PTIS-dense dataflow

```
                   }
             }
         out_buf[k'][1:K][1:Wt][1:Ht] = acc_buf[1:K][1:Wt][1:Ht];
       }
```

Note that the output positions associated with an output buffer (out_buf) may be computed using the loop indices as shown in section (F) of TABLE 2.

To scale beyond the practical limits of multiplier count and buffer sizes within a PE 220, a tiling strategy may be employed to spread the work across an array of PEs 210 so that each PE 210 can operate independently. In one embodiment of the PTIS-dense technique, the W×H element activation plane is partitioned into smaller $W_t \times H_t$ element tiles that are distributed across the PEs 210 within the SCNN accelerator 200. Each tile extends fully into the input-channel dimension C, resulting in an input-activation volume of $C \times W_t \times H_t$ assigned to each PE 210. Weights are broadcast to the PEs 210 and each PE 210 operates on an exclusive subset of the input and output activation space. In other words, there is no duplication of input activations or output activations between the PEs 210.

Unfortunately, strictly partitioning both input and output activations into $W_t \times H_t$ tiles does not work because the sliding-window nature of the convolution operation introduces cross-tile dependencies at tile edges. These dependencies are called halos. Halos can be resolved in two ways. The first technique for handling halos is to size the input activations buffer 235 in each PE 210 to be slightly larger than $C \times W_t \times H_t$ to accommodate the halos. The halo input activation values are replicated across adjacent PEs 210, but the computed products are strictly private to each PE 210. Replicated input activation values can be multicast when the input activation values are stored into the input activations buffer 235. The second technique for handling halos is to size the accumulation buffer in each PE 210 to be slightly larger than $K_c \times W \times H$ to accommodate the halos. The halos now contain incomplete partial sums that must be communicated to neighbor PEs 210 for accumulation. In one embodiment, the communication between neighboring PEs 210 occurs at the end of computing each output-channel group.

The PTIS-sparse technique is a natural extension of the PTIS-dense technique, with the PTIS-sparse technique exploiting sparsity in the weights and activations. The PTIS-sparse dataflow is specifically designed to operate on compressed-sparse (i.e., compacted) encodings of the weights and input activations and to produce a compressed-sparse encoding of the output activations. At a CNN layer boundary, the output activations of the previous layer become the input activations of the next layer. The specific format used to generate the compressed-sparse encoded data is orthogonal to the sparse architecture itself. What is key is that decoding a sparse format ultimately yields a non-zero data value and a position indicating the coordinates of the value in the weight or input activation matrices. In one embodiment, the position is defined by an index or an address, such as an address corresponding to one of the accumulation buffers 250 or adder units 255.

Figure 3A:
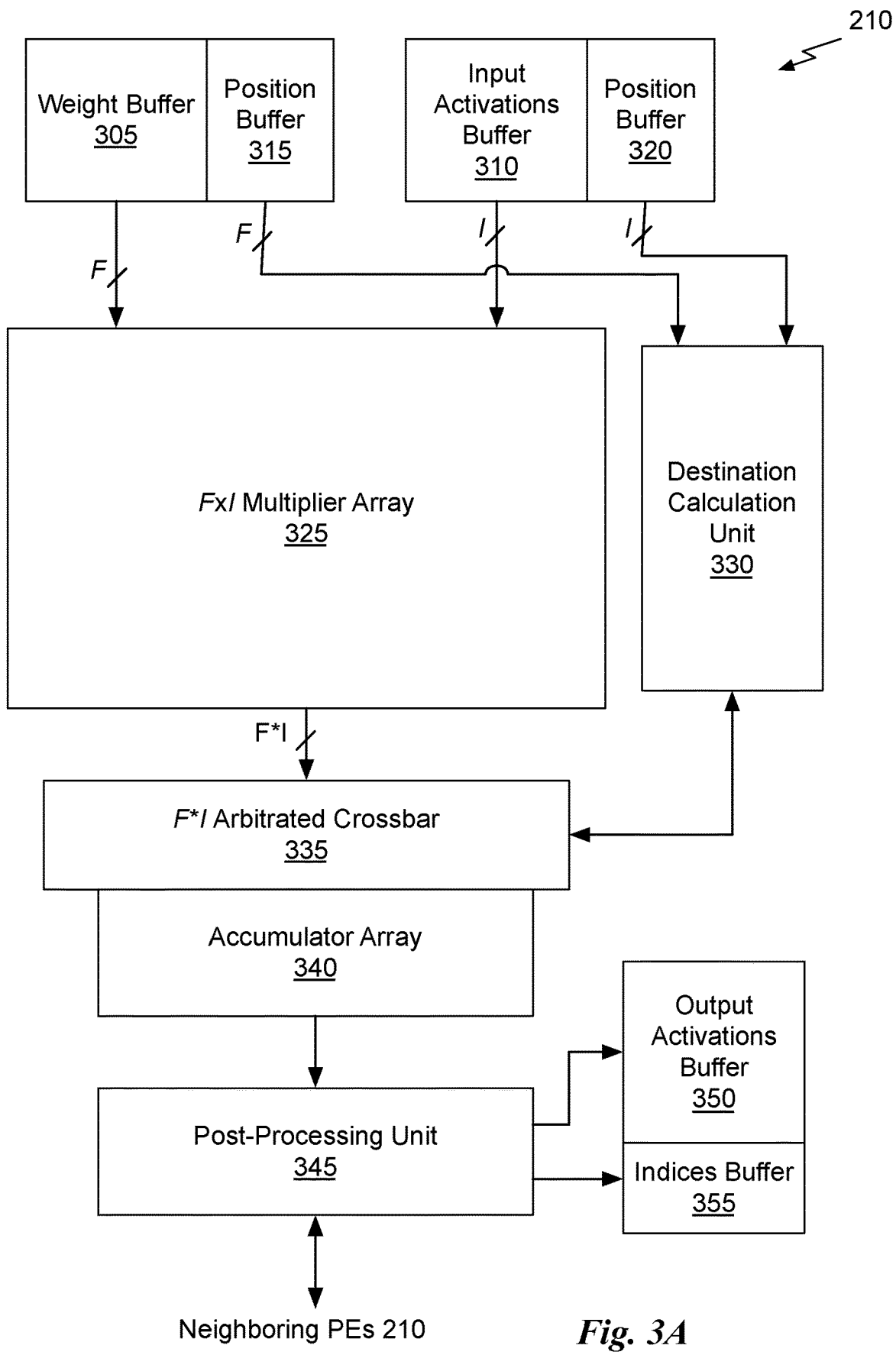
FIG. 3A illustrates a block diagram of another processing element, in accordance with one embodiment.

FIG. 3A illustrates a block diagram of a PE 210, in accordance with one embodiment. The PE 210 is configured to support the PTIS-sparse dataflow. Like, the PE 220 shown in FIG. 2C, the PE 210 includes a weight buffer 305, an input activations buffer 310, and an F×I multiplier array 325. Parallelism within a PE 210 is accomplished by processing a vector of F non-zero filter weights a vector of I non-zero input activations in within the F×I multiplier array 325. F×I products are generated each processing cycle by each PE 210 in the SCNN accelerator 200. In one embodiment F=I=4. In other embodiments, F and I may be any positive integer and the value of F may be greater than or less than I. The values of F and I may each be tuned to balance overall performance and circuit area. With typical density values of 30% for both weights and activations, 16 multiplies of the compressed sparse weight and input activation values is equivalent to 178 multiplies in a dense accelerator that processes weight and input activation values including zeros.

The accumulator array 340 may include one or more accumulation buffers and adders to store the products generated in the multiplier array 325 and sum the products into the partial sums. The PE 210 also includes position buffers 315 and 320, indices buffer 355, destination calculation unit 330, F*I arbitrated crossbar 335, and a post-processing unit 345.

To facilitate easier decoding of the compressed-sparse data, weights are grouped into compressed-sparse blocks at the granularity of an output-channel group, with $K_c \times R \times S$ weights encoded into one compressed-sparse block. Likewise, input activations are encoded at the granularity of input channels, with a block of $W \times H_t$ encoded into one compressed-sparse block. At each access, the weight buffer 305 and the position buffer 315 deliver a vector of F non-zero filter weights along with the associated positions (e.g. coordinates) within the $K_c \times R \times S$ region, respectively. Similarly, the input activations buffer 310 and position buffer 320 deliver a vector of I non-zero input activations and the associated positions (e.g., coordinates) within the $W \times H_t$ region, respectively. Similar to the PTIS-dense dataflow, the F×I multiplier array 325 computes the full cross-product of F×I partial sum outputs, with no extraneous computations. Unlike a dense architecture that includes zero values, output coordinates defining the output positions are not derived from loop indices in a state machine, but are instead derived from the positions (e.g, coordinates) of the non-zero elements embedded in the compressed format.

Even though calculating the output positions of the products is not difficult, unlike the PTIS-dense technique, the products are not typically contiguous using the PTIS-sparse technique. Thus, the products generated by the F×I multiplier array 325 need to be scattered to discontiguous positions within the $K_c \times W_t \times H_t$ output space. Because any partial sum in the output space can be zero, the accumulator array 340 stores data in a dense format that may include both non-zero and zero values. In fact, output activations will probabilistically have high density even with a very low density (i.e., high sparsity) of weights and input activations, until the output activations pass through a ReLU operation.

To accommodate the accumulation of sparse partial sums, the monolithic $K_c \times W_t \times H_t$ accumulation buffer 250 used in the PTIS-dense dataflow is modified to be a distributed array of smaller accumulation buffers accessed via a scatter network which can be implemented as a crossbar switch, such as the F×I arbitrated crossbar 335. The F×I arbitrated crossbar 335 routes F×I products to an array of A accumulator units based on the output positions associated with each product. The positions may be translated to form an address. A particular product is transmitted to the one accumulator unit in the accumulator array 340 that is configured to compute the output activation for the position associated with the product. Taken together, a scatter accumulator array comprising the F×I arbitrated crossbar 335 and accumulator array 340 is associated with a $K_c \times W_t \times H_t$ address range. The address space is distributed across the A accumulator units and each accumulator unit includes a bank of addressable storage and an adder to accumulate a partial sum (when processing of a tile is complete, the partial sum is an output activation) for the output position.

The PTIS-sparse technique can be implemented via small adjustments to the pseudo-code shown in TABLE 2. Instead of a dense vector fetches, (B) and (D) are modified fetch the compressed sparse input activations and weights, respectively. In addition, the positions of the non-zero elements in the compressed-sparse form of the data structures are fetched from the respective buffers (not shown in TABLE 2). After the weights, input activations, and positions are fetched, the accumulator buffer (F) is indexed with the output positions computed from the sparse weight and sparse input activations.

In one embodiment, the accumulation unit 245 shown in FIG. 2C and the scatter accumulator array is doubled buffered so that products generated for one tile of weights are accumulated into one set of adders within the accumulator array 340 while registers in the accumulator array 340 storing partial products for the previous tile are accessed to resolve halos and encode the resulting output activations into the compressed format. Finally, when the computation for the output-channel group has been completed, the accumulator array 340 is drained and the compressed output activations are stored into the output activations buffer 350 and the output coordinates are stored into the indices buffer 355.

TABLE 3 shows pseudo-code for the PTIS-sparse dataflow. Referring to FIG. 2A, the layer sequencer 215 controls the memory interface 205 to read the weights once from off-chip DRAM in fully compressed form and transmit the weights to the PEs 210. Within each PE 210, the weights are ordered by tile (i.e., output channel group) (g), then by input channel (c), then by output channel within the tile (k). The per-PE computation using the tile/input channel/output channel ordering is shown in TABLE 3.

TABLE 3 pseudo-code for the PTIS-sparse dataflow

For each tile g in G // Each tile is a set of contiguous channels
g={k_i, k_{i+1}, ... k_j}
    For input channel c in C //
        For each input activation a in c // read each input activation
        exactly once per tile
            For each weight w in g with input channel c //
                p = a * w ; // compute product and the associated
                output position
                A[p.position] += p.value ; // sum into appropriate
                accumulator
For position j in Halo
    Send A[j] to home PE and sum into home accumulator
Apply non-linear function to A[*]
Encode A[*] in sparse format and transfer to output activations buffer Processing Element Referring to FIG. 3A, as the weights are read by the memory interface 205 from DRAM, the weights are broadcast to the PEs 210 and held locally in a per-PE weight buffer 305. The input activations may be read by the memory interface 205 from DRAM or transmitted from the output activations buffer 350 and stored locally in a per-PE input activations buffer 310.

A state machine within the destination calculation unit 330 operates on the weight and input activations in the order defined by the PTIS-sparse dataflow to produce an output-channel group of $K_c \times W_t \times H_t$ partial sums inside the accumulator array 340. First, a vector F of compressed weights and a vector I of compressed input activations are fetched from the weight buffer 305 and the input activations buffer 310, respectively. The vectors are distributed into the F×I multiplier array 325 that computes a form of the cartesian product of the vectors.

While the vectors are processed by the F×I multiplier array 325 to compute products, the positions from the sparse-compressed weights and activations are processed by the destination calculation unit 330 to compute the output positions associated with the products. The F×I products are delivered to an array of A accumulator units within the accumulator array 340, that are addressed by the output positions. Each accumulator unit within the accumulator array 340 includes an addressible bank of storage, adder, and a register for storing partial sums associated with the output-channel group being processed. When processing of an output-channel group is complete, the partial sum stored in each register is the output activation value for one of the output positions. In one embodiment, the accumulator units are double-buffered so that one set of registers can store new partial sums while the second set of registers are drained out by the post-processing unit 345. When the output-channel group is complete, the post-processing unit 345 performs the following tasks: (1) exchange partial sums with neighboring PEs 210 for the halo regions at the boundary of the PE's 210 output activations, (2) apply the non-linear activation (e.g. ReLU), pooling, and dropout functions, and (3) compress the output activations into the compressed-sparse form and write the compressed-sparse output activations into the output activations buffer 350 and write the output positions associated with the compressed-sparse output activations into the indices buffer 355. In one embodiment, the post-processing unit 345 includes a compaction engine that is configured to encode the output activations and output positions into the compressed-sparse form.

In one embodiment, the weight buffer 305 is a first-in first-out FIFO buffer (WFIFO). The weight buffer 305 should have enough storage capacity to hold all of the non-zero weights for one input channel within one tile (i.e., for the inner most nested "For" in TABLE 3). When possible, the weights and input activations are held in the weight buffer 305 and input activations buffer 310, respectively, and are never swapped out to DRAM. If the output activation volume of a neural network layer can serve as the input activation volume for the next neural network layer, then the output activations buffer 350 is logically swapped with the input activations buffer 310 between processing of the different neural network layers. Similarly, the indices buffer 355 is logically swapped with the buffer 320 between processing the different neural network layers.

In one embodiment, when the weight buffer 305 within any PE 210 becomes full, broadcasting of the weight values into the weight buffer 305 is stalled. If the weight buffer 305 is big enough to hold a few input channels of a tile, some PEs 210 can move ahead to the next input channel while one or more other PEs 210 are a few channels behind—smoothing out load imbalance between PEs 210. In one embodiment, the weight buffer 305 has enough storage capacity to hold more than all of the weights in a tile (i.e., output-channel group) to smooth over some load imbalance between PEs 210.

The different logic blocks within the PE 210 may be pipelined as needed to achieve a target clock rate. However, the pipeline registers between pipeline stages need to freeze if the logic block receiving data output by the pipeline registers is stalled. Alternatively, elastic buffers can be used between the pipeline stages to simplify the distribution of a ready signal that indicates data can be accepted.

In one embodiment, the weight buffer 305 is a FIFO buffer that includes a tail pointer, a channel pointer, and a head pointer. The layer sequencer 215 controls the "input" side of the weight buffer 305, pushing weight vectors into the weight buffer 305. The tail pointer is not allowed to advance over the channel pointer. A full condition is signaled when the tail pointer will advance past the channel pointer when another write vector is stored. The buffer 315 may be implemented in the same manner as weight buffer 305 and is configured to store the positions associated with each weight vector. In one embodiment, the weight buffer 305 outputs a weight vector of F weights {w[0] . . . w[F−1]} and the buffer 315 outputs the associated positions {x[0] . . . x[F−1]}. Each position specifies r, s, and k for a weight. The output channel k is encoded relative to the tile. For example, if the tile contains channels 40-47, channel 42 is encoded as k=2—an offset of 2 from 40, the base of the tile.

The destination calculation unit 330 controls the head and channel pointers (HeadPtr and ChannelPtr) of the weight buffer 305 and the buffer 315, to sequence the computation of a tile. The input activations buffer 310 and buffer 320 may be a set of registers or SRAM that are configured to store the input activations and the positions associated with each input activation value. The destination calculation unit 330 also controls a pointer (IA ptr) into the input activations buffer 310 and the buffer 320, to sequence the computation of a tile. The sequence that is implemented by the destination calculation unit 330 corresponds to the three inner loops of the pseudo-code shown in TABLE 3. Pseudo-code for operation of the destination calculation unit 330 is shown in TABLE 4. ScatterAdd is a function that transmits the products to the A accumulator units within the accumulator array 340.

TABLE 4 pseudo-code for sequencing computations for a tile

```
For c = 1 to C
    ChannelPtr = start of channel c in the weight buffer
    IAPtr = start of channel c in the input activations buffer
    IACnt = Number of non-zero IA entries in channel c // each entry
    is / wide
    Do
        HeadPtr = ChannelPtr // Rewind the weight buffer to start of
        channel c
        WCnt = Number of non-zero weight entries in c // each entry is
        F wide
        A[1:I] = IABuffer[IAPtr] // read next / activations, value and
        position for each
        Do
            W[1:F] = Wbuffer[HeadPtr] // read next F weights,
            value and position for each
            P[1:P] = OuterProduct(W [1: F], A[1: I]) // multiply
            all pairs of weights and IAs
            ScatterAdd(P[1:P])
            HeadPtr = HeadPtr+1
            WCnt=WCnt−1
```

TABLE 4-continued pseudo-code for sequencing computations for a tile

```
While(WCnt > 0)
    IAPtr = IAPtr + 1
    IACnt = IACnt−1
While(IACnt > 0)
```

While the pseudo-code shown in TABLE 4 is several lines long, each iteration of the inner loop takes a single cycle and the overhead of incrementing the counters and testing the loop bounds takes place in parallel. Therefore, the F*I multiplier array 335 performs F×I multiplies (of values and positions) each processing cycle unless the weight buffer 305 goes empty or the F*I arbitrated crossbar 335 signals that it cannot accept inputs. When the processing is not stalled, the destination calculation unit 330 increments the head pointers each processing cycle, outputting another vector of F weights (and associated positions) each processing cycle. The destination calculation unit 330 continues to increment the head pointer, each processing cycle that the processing is not stalled, until the next increment would pass the end of the current channel (i.e. pass the channel pointer). When the end of the current channel is reached, the destination calculation unit 330, advances the IAPtr and the head pointer is rolled back (i.e., rewound) to the start of the current channel. The IAPtr is then used to read the next vector of I input activations and the rolled back head pointer is used to read the first vector of F weights. The destination calculation unit 330 then sequences all of the weights for another vector of input activations to produce another vector of products. When the last vector of input activations for channel c is processed, the destination calculation unit 330 advances to channel c+1 by setting the channel pointer to point to the first weight vector of the channel c+1.

At the end of an input channel not all F weights or I activations may be valid. Invalid activations are indicated by a value of zero and will not result in a request to the ScatterAdd function. The end of an input channel c is identified by count. The weights and activations for each input channel are preceded by a count of the non-zero elements for the channel. At the start of the channel IACnt and WCnt are initialized to the number of I-wide or F-wide entries for the channel. IACnt and WCnt are decremented after each vector is consumed and checked for zero to determine the end of the channel. In one embodiment, to avoid losing a processing cycle reading IACnt and WCnt for a channel, the counts are kept in a pair of separate small RAMs—one for weight counts and one for IA counts (not shown in FIG. 3A).

Position Conversion to an Accumulator Address

Figure 3B:
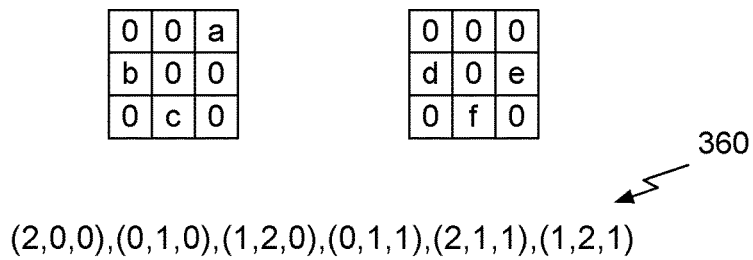
FIG. 3B illustrates two 3×3 weight kernels and positions, in accordance with one embodiment.

FIG. 3B illustrates two 3×3 weight kernels and positions, in accordance with one embodiment. A first set of weights for k=1 includes the non-zero elements a, b, and c and a second set of weights for k=2 includes the non-zero elements d, e, and f. The (r,s,k) format encodes positions for the non-zero weights as the following position vector: (2,0,1), (0,1,1),(1,2,1),(0,1,2),(2,1,2),(1,2,2).

As multiplication is performed on the "value" component of each (value, position) pair, the destination calculation unit 330 performs a vector addition on the positions—giving a (x, y, k) position (e.g., output coordinates) for the resulting product. Specifically, for each product, the x coordinates associated with the weight and input activation positions are summed and the y coordinates associated with the weight and input activation positions are summed to produce the (x, y, k) position for the resulting product. For example, summing the first position in the weight position vector with a set of four positions of non-zero input activations, (7,3), (12,3), (20,3), and (24,3) produces a product position vector (9,3,1),(14,3,1),(22,3,1), and (26,3,1).

The destination calculation unit 330 then linearizes the coordinates of the output position to produce an accumulator address that is output to the F*I arbitrated crossbar 335. TABLE 5 is pseudo-code for the operations performed in the F*I multiplier array 325 and destination calculation unit 330.

TABLE 5 pseudo-code for product and position computations

```
forall f = 0: F −1 // in parallel
    forall i = 0:I−1 // in parallel
        t = f + i*F ; // index of product
        p[t].value = w[f].value * a[i].value ; // compute value
        p[t].x = w[f].r + a[i].x ; // x-coordinate of position
        p[t].y = w[f].s + a[i].y ; // y-coordinate of position
        p[t].k = w[f].k ; // k-coordinate of position
    endfor
endfor
```

The "forall" in TABLE 5 implies that all P iterations of the inner loop are performed in parallel—in a single cycle. In one embodiment, after computing the output position of each product p[t] in (x,y,k) form, the output position is linearized into an accumulator address p[t].a according to the formula:

$$p[t].a = p[t].x + p[t].y * \max\_x\_oa + p[t].k * \max\_x\_oa * \max\_y\_oa \qquad \text{Equation (1)}$$

Note that max_x_oa is typically greater than max_x_ia by one less than R, the width of the convolution kernel, max_x_weight. Similarly, max_y_oa is typically greater than max_y_ia by one less than S, the height of the convolution kernel, max_y_weight. max_x_oa and max_y_oa refer to the dimensions of the halo. Continuing with the previous example, the output position vector (9,3,0),(14,3,0),(22,3,0), and (26,3,0) is converted into 105, 110, 118, and 122, assuming an output tile has a max_x_oa=32.

The F*I arbitrated crossbar 335 transmits the products to the associated accumulator in the accumulator array 340 based on the product positions. The low bits of the linearized accumulator address are used by the F*I arbitrated crossbar 335 to route each product to an accumulator unit in the accumulator array 340 and the product is added to a partial sum by the adder within the accumulator array 340 that is selected by the high bits of the address. The operation of the F*I arbitrated crossbar 335 is described in detail in conjunction with FIG. 3C.

When arbitration is used and two products are associated with the same output position (e.g., address), one of the two products is transmitted by the F*I arbitrated crossbar 335 and stored in an accumulator unit within the accumulator array 340 while the other product destined for the same accumulator unit is stalled by the F*I arbitrated crossbar 335. Each accumulator unit may be considered to be a bank of addressable storage combined with an adder so that products associated with the same address can be accumulated. In one embodiment, when one product is stalled, output registers in the F*I multiplier array 325 are stalled and computation of new products stalls. In one embodiment, a FIFO buffer at the output of each multiplier in the F*I multiplier array 325 is used to smooth load imbalance between accumulator units. Performance improvement may be provided when the number of banks A is larger than the number of products F*I. In one embodiment, A=2 F*I, where F*I=16 and A=32.

After all partial sums for one tile have been computed, the doubled-buffered accumulator array 340 is switched. The PE 210 may begin processing of the next tile using the "primary" of accumulator array 340 while the post-processing unit 345 begins post-processing of the last tile in parallel using the "secondary" accumulator array 340. The post-processing unit 345 performs the following steps: halo resolution, non-linear function evaluation, and encoding. The adders and registers in the "secondary" accumulator array 340 are also cleared to force the partial sums for a subsequent tile to values of zero as the encoding process is completed.

Scatter-Add

A scatter-add function is performed by a combination of the F*I arbitrated crossbar 335 and the accumulator array 340. The F*I arbitrated crossbar 335 receives F*I=P products and output positions from the F×I multiplier array 325. In one embodiment, the output positions are represented as linear addresses. The products are routed to adders within the accumulator array 340, where each product is routed to a particular adder selected by the linear address associated with the product. In one embodiment, the products are routed to the adders through a buffer (e.g., an accumulator unit). The product is then added to the value stored in the register paired with the adder to generate a partial sum. TABLE 6 is pseudo-code for the scatter-add function performed by the F*I arbitrated crossbar 335 and the accumulator array 340.

TABLE 6 pseudo-code for the scatter-add function

Forall (t = 0:(I*F−1)) do
   Acc[p[t].a] = Acc[p[t].a] + p[t].value ;
endfor

To simplify addressing of the adders, the number of accumulator units should be a power of 2, A=2^b, where b is an integer. The low order bits of address a select the accumulator unit containing Acc[a], and the high order bits of address a specify an offset within the storage within the accumulator unit. The F*I arbitrated crossbar 335 includes a network to route values to the appropriate accumulator unit. A should be larger than F*I to reduce contention for the accumulator units and provide adequate processing throughput. For small values of A, the network can be a single stage of arbitrated multiplexers. For larger values of A, a multi-stage network may be used to reduce wiring complexity. In one embodiment a FIFO is provided on each input to the F*I arbitrated crossbar 335 to smooth out load imbalance between the accumulator units.

Figure 3C:
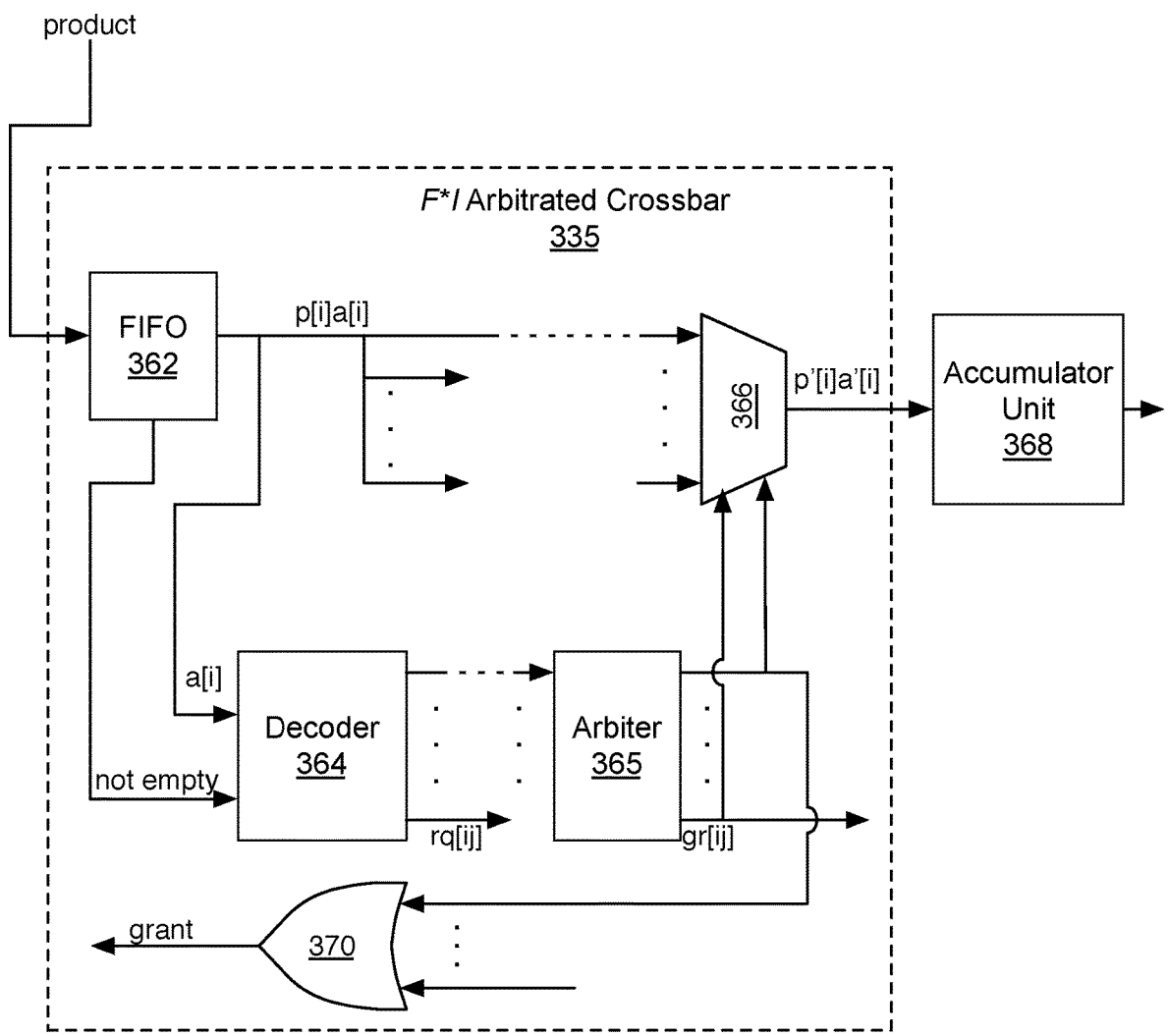
FIG. 3C illustrates a single-stage F*I arbitrated crossbar, in accordance with one embodiment.

FIG. 3C illustrates a single-stage F*I arbitrated crossbar 335, in accordance with one embodiment. The single-stage F*I arbitrated crossbar 335 includes a FIFO 362, decoder 364, arbiter 365, multiplexer 366, and an OR-gate 370. An accumulator unit 368 within the accumulator array 340 is coupled to the output of the mux 366. Head-of-line blocking at the accumulator array 340 can be avoided by using multiple input FIFOs at the accumulator units 368 and having each FIFO hold (p,a) pairs for a subset of the accumulator units 368. Only one input and one accumulator unit 368 are shown in FIG. 3C. A complete F*I arbitrated crossbar 335 includes P FIFOs 362, P decoders 364, P OR-gates 370, A arbiters 365, and A multiplexers 366 coupled to A accumulator units 368.

Products p[i] are pushed into the FIFO 362. In one embodiment, the FIFO 362 has a depth of 2 or 3. When any one of the FIFOs 362 fills, the F*I arbitrated crossbar 335 becomes not-ready and stalls the F×I multiplier array 325. The output of the FIFO 362 consists of a product p[i] and an address a[i]. Product p[i] from input i is connected to the ith input of the multiplexer 366 at the input to each accumulator unit 368. The low bits of address a[i] are decoded by the decoder 364 to a one-hot request vector r[i][j]. Across all inputs, if r[i][j] is true, it implies that input i is making a request for the jth accumulator unit 368. When the FIFO 362 is empty the decoder 364 is disabled, so that no requests are asserted. In one embodiment, selecting the low-bits of a[i] is replaced with a hash to spread the addresses in the accumulator array 340 across the accumulator units 368 to reduce bank conflicts.

Each accumulator unit 368 in the accumulator array 340 functions as a bank of storage (e.g., a latch or register array) associated with an adder. The requests rq[*][j] from the decoder 364 to the accumulator unit 368 are input to the arbiter 365. The arbiter 365 generates a grant vector gr[*][j] (selecting the winning i for the j accumulator unit 368). Across all the accumulator units 368, if bit gr[i][j] of the P×I grant matrix is true, it implies that input i has been granted access to the j accumulator unit 368 for the next cycle. The grant signals are used both to control the multiplexer 366, to select the winning product and address from the multiplexer inputs and providing an indication back to the FIFO 362—so the winning product is dequeued from the FIFO 362 at the end of the processing cycle.

Figure 3D:
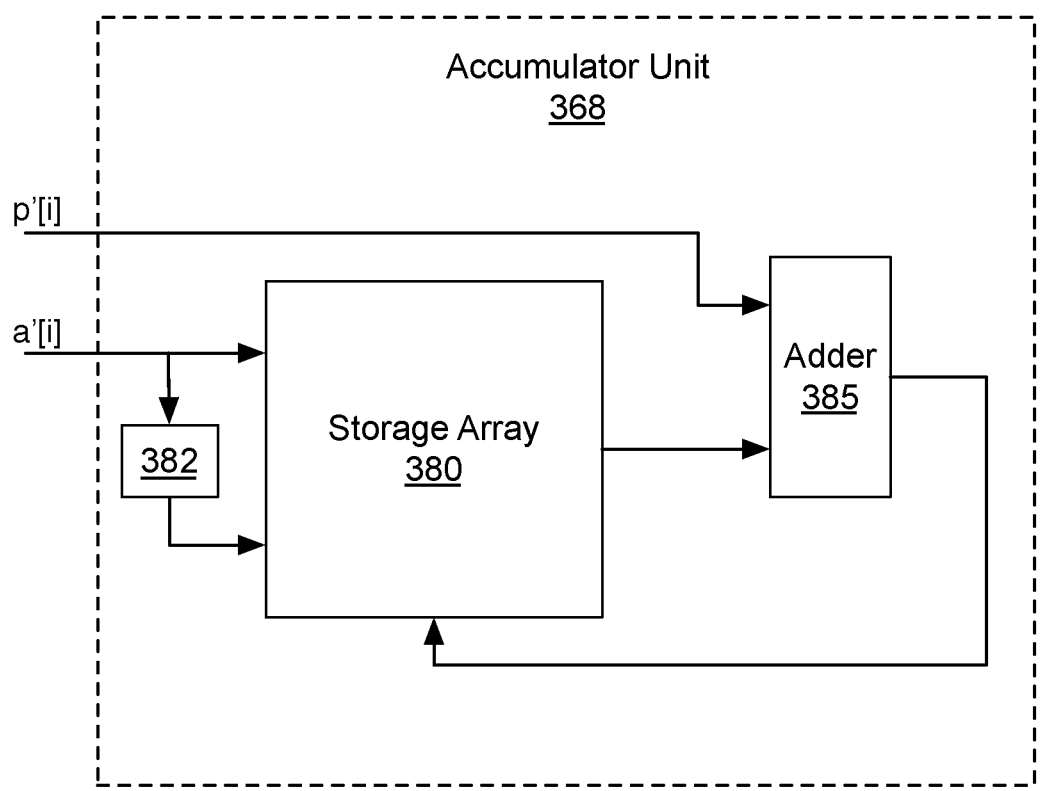
FIG. 3D illustrates an accumulator unit, in accordance with one embodiment.

FIG. 3D illustrates the accumulator unit 368, in accordance with one embodiment. The accumulator unit 368 includes a flip-flop 382, storage array 380, and an adder 385. The address output of the multiplexer 366 is used to select one latch or register from the storage array 382 for output to the adder 385. The storage array 380 stores partial sums and is read using the address a' [i]. The product p' [i] received by the accumulator unit 368 is summed with the partial sum stored in the storage array 380 at the location associated with the address a' [i]. As shown in FIG. 3D, the address a' [i] is pipeline by a flip-flop 382 and thereby delayed by one clock cycle to be used as a write address for storing the sum output by the adder 385. In other embodiments, a' [i] may be delayed by more than one clock cycle to write the sum generated by the adder 385 to accumulate the product into the partial sum.

Head-of-line blocking at the accumulator array 340 can be avoided by using multiple input FIFOs at the accumulator unit 368 and having each FIFO hold (p,a) pairs for a subset of the accumulator units 368. In one embodiment, a separate FIFO is provided at each the input to each adder 385 for each one of the accumulator units 368 (i.e., virtual output queueing is employed at outputs of the accumulator units 368). A drawback of the single-stage F*I arbitrated crossbar 335 shown in FIG. 3C is complex wiring because there is a direct path from every product input to every accumulator unit 368 resulting in P×A paths. For example, with P=16 and A=32, there are 1012 paths, each carrying a product, an address, a request and returning a grant. The wiring complexity can be reduced by factoring the scatter-add function.

Figure 3E:
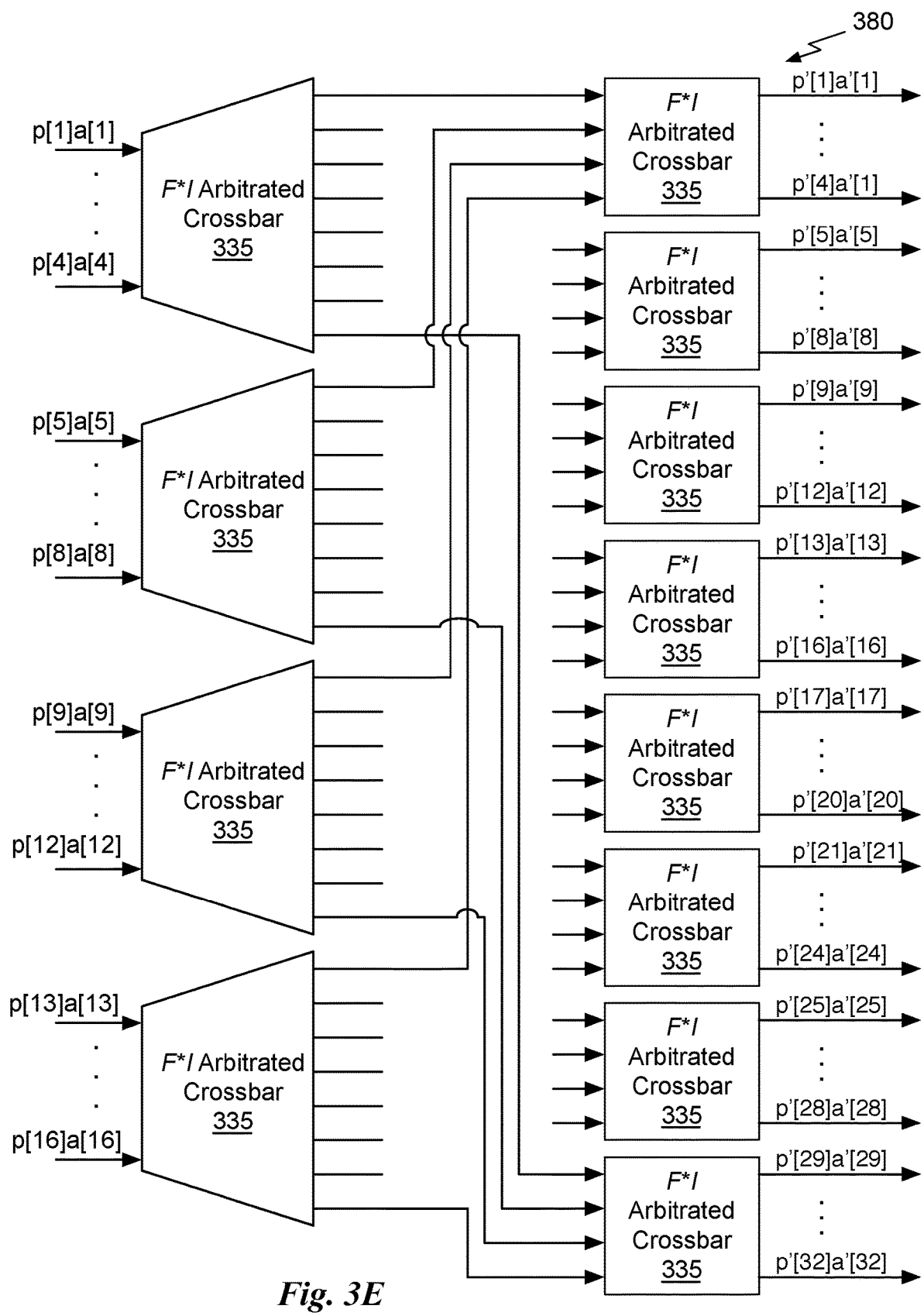
FIG. 3E illustrates a two-stage F*I arbitrated crossbar, in accordance with one embodiment.

FIG. 3E illustrates a two-stage F*I arbitrated crossbar 380, in accordance with one embodiment. Although the two-stage F*I arbitrated crossbar 335 is described for P=16 and A=32, other values of P and A may be used in two or more stages. A first stage is 4 instances of the single-stage F*I arbitrated crossbar 335 with P=4 and A=8. A second stage is 8 instances of the single-stage F*I arbitrated crossbar 335 with P=4 and A=4. Each of the stages requires 128 direct paths. The number of stages can be increased to reduce the number of direct paths. In one embodiment, FIFOs are included at the intermediate stages of a multi-stage arbitrated crossbar. However, if all arbitration can be completed in one processing cycle, FIFOs at the intermediate stages do not necessarily provide any benefit in terms of processing throughput.

The energy of accessing the accumulator array 340 may be reduced by combining products associated with the same output position. In one embodiment, to maximize the probability of combining, products are buffered at the accumulator units 368 in a combining buffer (e.g., a FIFO with 8 entries) and the products are only accumulated into the partial sum when the combining buffer becomes full. Addresses of arriving products are compared to entries in the combining buffer and when an address of an arriving product matches the address of a stored product, the arriving product is summed with the stored product. In one embodiment, the combining buffers have multiple write ports, allowing two or more arriving products to be inserted into the combining buffer simultaneously.

Post-Processing

The post processing unit 345 performs three functions: halo resolution, non-linear function evaluation, and sparse output activation encoding. In one embodiment, the accumulator array 340 is double-buffered. The three functions are performed on completed tile of output activations in the secondary accumulator array 340 while a current tile of output activations is being computed in the primary accumulator array 340.

The operation count of the post-processing unit 345 is relatively low compared to the F×I multiplier array 325. The F×I multiplier array 325 performs a 6-nested loop (over x,y,r,s,c,k) while the post-processing unit 345 only performs a 3-nested loop (over x,y,k). Thus, a post-processing unit 345 performing one operation per cycle should keep pace with a F×I multiplier array 325 that performs 16 operations per cycle. In one embodiment, the post-processing unit 345 is implemented using a microcontroller or a state machine. The pseudo-code for halo resolution is shown in TABLE 7.

TABLE 7

Pseudo-code for halo resolution

For halo region q = 0:7
   x1, x2, y1, y2, xo, yo, pe = haloDescriptor[q] ; // 7-tuple descriptor for each halo region
     for x = x1:x2
       for y = y1:y2
         for k = 0:|h|
           src = linearAddress(x,y,k) ; // compute accumulator address in this PE
           dst = linearAddress(x+xo,y+yo,k) ; // compute address in destination PE
           send(pe, dst, A[src]) ;
         endfor
       endfor
     endfor
endfor The Pseudo-code shown in TABLE 7 iterates over the eight halo regions. Each region is described by a 7-tuple that is loaded from a region descriptor table. The 7-tuple includes the x- and y-ranges of the halo region in the source PE 210 (x1:x2, y1:y2). The 7-tuple includes the x- and y-offset (xo, yo) to translate a position in this PE 210 to a position in the destination PE 210. (The offsets are signed values). Finally, the 7-tuple includes the neighbor number of the destination PE 210. The linearAddress function converts (x,y,k) to a linear accumulator address as:

$$\text{linearAddress}(x,y,k) = x + y^* \max\_x\_oa + k^* \max\_x\_oa^* \max\_y\_oa. \quad \text{Equation (2)}$$

Consider an example where R×S=3×3 convolutions are performed on input activations with dimensions 50×50×c, and the result is a set of output activations with dimensions 52×52×|h|. The halo consists of eight regions—four edges and four corners. The eight region descriptors for this case are shown in TABLE 8.

TABLE 8

Halo region descriptors for R = S = 3 and W = H = 50

| | Region | | | | | | |
|---|---|---|---|---|---|---|---|
| | x1 | x2 | y1 | y2 | xo | yo | PE |
| Left | 0 | 0 | 1 | 51 | 51 | 0 | (−1, 0) |
| Top | 1 | 51 | 0 | 0 | 0 | 51 | (0, −1) |
| Right | 52 | 52 | 1 | 51 | −51 | 0 | (1, 0) |
| Bottom | 1 | 51 | 52 | 52 | 0 | −51 | (0, 1) |
| Upper-Left | 0 | 0 | 0 | 0 | 51 | 51 | (−1, −1) |
| Upper-Right | 52 | 52 | 0 | 0 | −51 | 51 | (1, −1) |
| Lower-Right | 52 | 52 | 52 | 52 | −51 | −51 | (1, 1) |
| Lower-Left | 0 | 0 | 52 | 52 | 51 | −51 | (−1, 1) |

In the example, the Left region specifies a source range of (0,1:51), an offset of (51,0), and a PE 210 having coordinates of (−1,0) relative to the current PE 210. The offset makes the destination range (51,1:51). The post-processing unit 345 uses the descriptor to read the accumulator array 340 within the PE 210, walking the left edge and sending value, position pairs to a neighboring PE 210 to the left (−1, 0). The neighboring PE 210 handles the value, position pairs in the same manner as the value, position pairs coming from the F×I multiplier array 325 except that the value, position pairs are input to the secondary accumulator units 368. Additional input ports are provided by the F×I arbitrated crossbar 335 to route the value, position pairs from each of the neighboring PEs 210 to the secondary accumulator units 368. The PEs 210 on the edges and corners of the PE array within the SCNN accelerator 200 will be missing 3 (edge) or 5 (corner) neighbors. The descriptors for the missing neighbors are marked invalid causing the post-processing unit 345 to skip halo resolution for non-existent neighbors.

After halo resolution for a PE 210 and all of its immediate neighbors is complete, the post-processing unit 345 scans the accumulator array 340 and performs a non-linear function for each output activation in the tile. The pseudo-code for the non-linear function is shown in TABLE 9.

TABLE 9

The non-linear function for x = x1: x2 // non-halo region of x
  for y = y1:y2 // non-halo region of y
    for k = 0:|h| // entire tile in k
      addr = linearAddress(x,y,k) ;

TABLE 9-continued

The non-linear function

```
            A[addr] = function(A[addr]) ;
        endfor
    endfor
endfor
```

The pseudo-code shown in TABLE 9 iterates over the non-halo region of the accumulator array 340. The non-halo region includes all of the accumulator units in the accumulator array 340 that were not part of an edge or corner region. For the previous example, the non-halo region is (1:51,1: 51). The most common non-linear function to be applied is the rectified non-linear function (ReLU) that converts negative values to zero, but other functions (such as sigmoid) may also be used. Some functions may be approximated as piecewise linear functions. In one embodiment, positive values below a predetermined threshold are forced to zero and negative values above a predetermined threshold are forced to zero.

After the non-linear function is applied to the tile in the secondary registers within the accumulator array 340, tile is encoded to compress out non-zero elements. The pseudo-code for the compression operation is shown in TABLE 10.

TABLE 10

Pseudo-code for the compression operation

```
OAptr = startOAptr ;
for k = 0:|h| // for each channel in the tile
    lastNZPos = (0,0) ; // initialize last non-zero position to start
        of channel
    nzCount = 0 ; // count non-zeros in this channel
    for x = x1: x2 // non-halo region of x
        for y = y1:y2 // non-halo region of y
            addr = linearAddress(x,y,k) ;
            if (A[addr] != 0) then // process non-zero
                pos = encode(lastNZPos, (x,y)) ;
                OARAM[OAptr] = (A[addr], pos) ;
                OAptr = OAptr + 1 ;
                lastNZPos = (x,y) ;
            end if
        endfor
    endfor
    emitCount(nzCount) ;
endfor
```

The pseudo-code shown in TABLE 10 walks the accumulator array 340 one channel of output activations at a time and writes a (value, position) entry to the output activations buffer 350 and indices buffer 355 for every non-zero output activation value. The function "encode" encodes the position relative to the last position using one of the methods described below. Note that "encode" may need to emit one or more "dummy" values (a non-zero having a value of zero) if the difference between the current position (x,y) and "lastNZPos" cannot be directly encoded. After each channel is processed, the number of non-zeros in that channel (nzCount) is stored in a separate table. When encoding outputs, the OAptr addresses single (value, position) entries in the output activations buffer 350 and indices buffer 355. After all tiles in a layer of the neural network have been completed, the output activations buffer 350 and indices buffer 355 and input activations buffer 310 and buffer 320, respectively, switch functions and the next layer of the neural network is processed. When the output activations buffer 350 and indices buffer 355 is switched, the IAptr reads four vectors of (value, position) at a time.

To increase parallelism beyond a single PE 210, multiple PEs 210 can be operated in parallel with each working on a disjoint three-dimensional tile of input activations. Because of the end-to-end compression of activations, both the input and output activations of each tile may be stored local to the PE 210 that processes the tile, further reducing energy-hungry data transmission. Overall, the SCNN accelerator 200 provides efficient compressed storage and delivery of input operands to the F×I multiplier array 325, high reuse of the input operands in the F×I multiplier array 325, and that spends no processing cycles on multiplications with zero operands.

Compressed-Sparse Weights and Activations

In addition to reducing energy consumption for weights and input activations of zero, the SCNN 200 architecture exploits sparse weights and activations. A dense encoding of sparse weights and activations is used to reduce the bandwidth needed to transmit the weight and activation values from the memory to the SCNN 200, between different levels of the memory hierarchy, and between the different logic circuits within the SCNN 200. Input data, such as weights and activations with zeros can be represented in a compact form referred to as compressed-sparse format. The amount by which the input data may be compressed increases as the number of zeros increases. However, even when only 10% of the multi-bit elements equal zero, it may be worthwhile to encode the input data in the compressed-sparse format. Encoding the sparse weights and/or activations reduces the data footprint, which allows larger matrices to be stored within a given size storage structure, such as the input activation buffer 235 and the weight buffer 230. In one embodiment the weight buffer 230 and the input activation buffer 235 each carry a 10-bit overhead for each 16-bit value to encode multi-dimensional positions of non-zero elements in the compressed-sparse format.

Figure 4A:
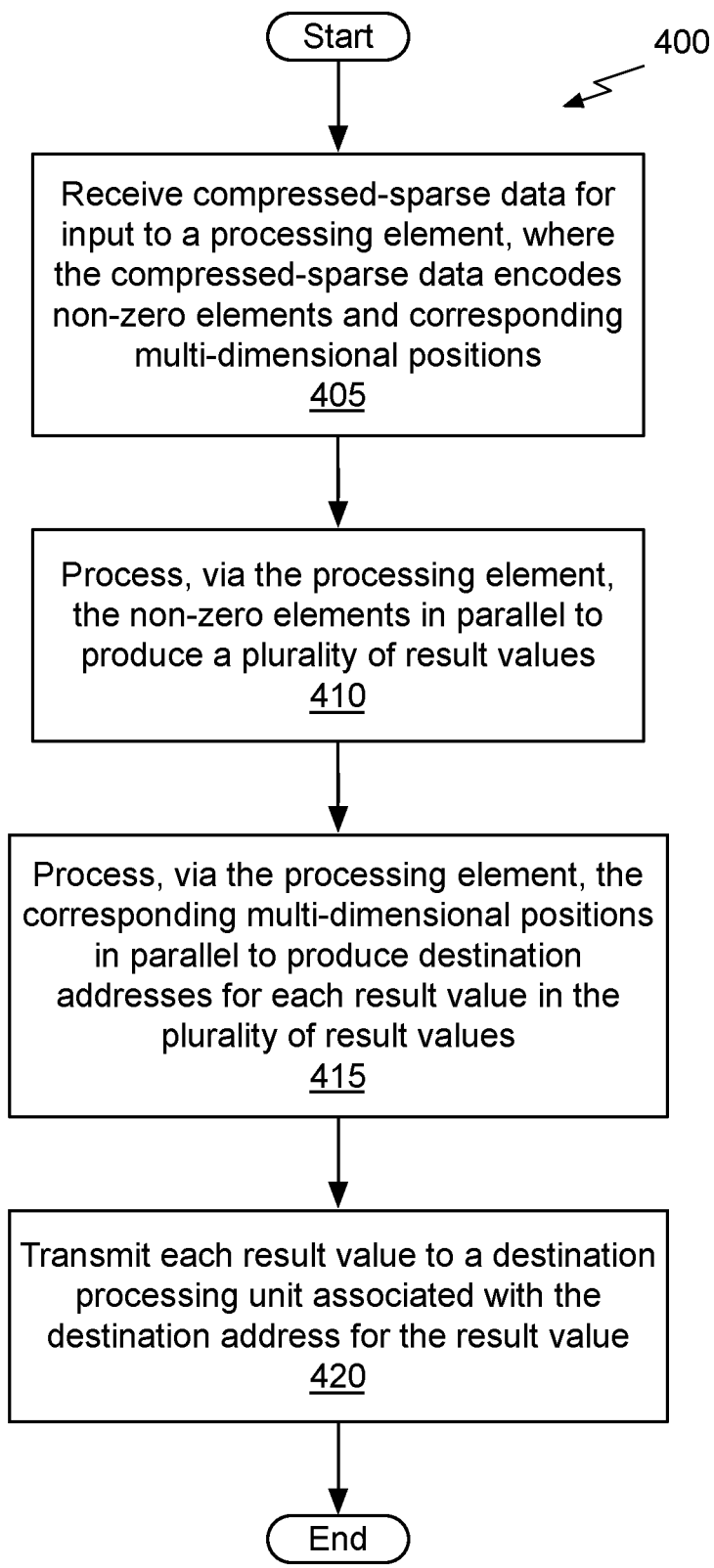
FIG. 4A illustrates a flowchart of a method for compressing weight and input activation values, in accordance with one embodiment.

FIG. 4A illustrates a flowchart of a method 400 for processing compressed-sparse data in the SCNN 200, in accordance with one embodiment. Although method 400 is described in the context of a processing element within the SCNN 200, the method 400 may also be performed by a program, custom circuitry, or by a combination of custom circuitry and a program. Furthermore, persons of ordinary skill in the art will understand that any system that performs method 400 is within the scope and spirit of embodiments of the present invention.

At step 405, compressed-sparse data is received for input to the PE 210, where the compressed-sparse data encodes non-zero elements and corresponding multi-dimensional positions. In one embodiment, the compressed-sparse data represents weight values. In another embodiment, the compressed-sparse data represents input activation values.

At step 410, the non-zero elements are processed in parallel by the PE 210 to produce a plurality of result values. In one embodiment, the non-zero elements are multiplied within the F×I multiplier array 325 to produce result values that are products. At step 415, the corresponding multi-dimensional positions are processed in parallel to produce destination addresses for each result value in the plurality of result values. In one embodiment, the multi-dimensional positions are processed in the destination calculation unit 330 to produce a destination accumulator address associated with a location in the accumulator array 340 for each one of the result values. Specifically, the destination accumulator address may indicate a location in the storage array 380 (i.e., bank) within an accumulator unit 368. At step 420, each result value is transmitted to an accumulator unit 368 that is associated with the destination address for the result value. In one embodiment, each result value is a product that is transmitted through the F*I arbitrated crossbar 335 to one of the accumulator units 368 based on the corresponding destination address.

In one embodiment, the SCNN 200 uses a simple compressed-sparse encoding approach based on a run-length encoding scheme. A data vector may be extracted from the compressed-sparse encoded data, where the data vector is a sequence non-zero values. An index vector may be extracted from the compressed-sparse encoded data, where the index vector is a sequence of zero-counts (the number of zeros between each non-zero element). For example, a compressed-space encoding of the data shown in FIG. 3B is (a, b, c, d, e, f) and (2, 0, 3, 4, 1, 1) representing a data vector and a corresponding index vector, where each element in the index vector is a number of zeros preceding the corresponding non-zero element.

Determining the coordinates of a location in the accumulator array 340 for each product output by a multiplier in the F×I multiplier array 325 requires reading the index vectors for F and I and combining the index vectors with the coordinates of a portion of the output activation space currently being processed. Four bits per index allows for up to 15 zeros to appear between any two non-zero elements. When more than 15 zeros occur between two non-zero elements, a zero-value placeholder (i.e., zero pad) is inserted as an intervening non-zero element without incurring any noticeable degradation in compression efficiency. With an expected non-zero element density of 30% there will be approximately 2 zeros between non-zero elements on average.

While the SCNN 200 will operate most efficiently when the activations fit in the input activation buffers 235, large networks may require activations to be saved to and restored from DRAM through the memory interface 205. Therefore, the SCNN 200 may employ a tiling approach that operates on a 2D subset of the activation space at a time. The DRAM accesses needed to read one tile of input activations can be hidden by pipelining the read operations in tandem with the computation of the previous tile of output activations. Similarly, reading of the weights from DRAM can be performed on a tile granularity.

In one embodiment, the weights are encoded in a compressed-sparse format of tiles that include at most K output channels, and the tiles are ordered by input channel. The goal is to maximize re-use of input activations under the constraint of a fixed number of accumulators (and hence a limit on the number of output channels). The compressed-sparse format allows reading of W weights and corresponding positions (r,s,k) in parallel for an input channel c. Therefore, a format where weights and positions have fixed locations is desired—so incremental decoding is not needed. Weight values are a four-dimensional array, where x, y, c, and k are the four dimensions. A tile is a slice of a weight data vector k in $\{k_1, k_2 \ldots, k_K\}$—i.e., arbitrary r,s values but with k restricted to a set of K values. A tile may be encoded in a compressed-sparse format including K (the number of output channels), $k_1, k_2 \ldots, k_K$ (the actual numbers of the K output channels), and C (the number of input channels in the tile). For each input channel, the compressed-sparse format includes a delta coded index c for the input channel (i.e., a difference from the previous input channel) and a count of the non-zero weights in the input channel. For each output channel k, the compressed-sparse format includes three parameters for each non-zero weight in kernel ck. A first parameter is the number of zeros between the previous non-zero weight and the current weight. Note that the zeros at the end of one kernel and the beginning of the next kernel are coded together. A second parameter is a coded weight value $w_{xyck}$ represented as either a binary weight or an index into a codebook.

FIG. 4B illustrates a tile 340 of weight values for two output channels, in accordance with one embodiment. In one embodiment, 3×3 convolutions may be performed using the tile 340 of weight values over two input channels to generate results for two output channels. The tile 340 of weight values is sparse and may be represented in a compressed-sparse format.

In one embodiment, the tile 340 of weight values is encoded as {2, 1, 2, 4, 0, 6, 1, 3, 4, 4, 1, 5, 0, 6, 3, 7, 3, 8, 0, . . . }. The first four symbols indicate the "shape" of the tile K=2 with $k_1$=1 and $k_{2=2}$, and C=4. The first 0 indicates the first input channel at offset of 0 from the starting position, c=0. The following 6 indicates there are six non-zero weights in the first input channel. The next six symbols are zero-count, weight pairs that encode the c=0, k=1 kernel. The 1 implies there is 1 zero before the 3, and the first 4 indicates 4 zeros between the 3 and the 4. Because the 5 is in the last position for c=0, k=1 we know that the zero after the 5 starts encoding the next channel. The next six symbols encode the c=0, k=2 kernel. The final 0 indicates that there are no empty channels before the next input channel, so the next symbols will encode channel c=1. The sequence of zero-counts indicates the number of zeros before the first non-zero weight value and between adjacent pairs of non-zero weight values.

After stripping off the tile header (2, 1, 2, 4) and the channel header (0, 6) the next 12 symbols can be read in parallel as the data vector and index vector, giving six weights along with the corresponding r,s,k positions. A running sum is needed to compute a linear index for each weight, and the linear indices are then converted to r,s,k position coordinates. To make it easier to decode the linear index into r,s coordinates, $r_{max}$ may be rounded up to the next power of 2. For example a 3×3 kernel becomes a 3×4 ($s_{max} \times r_{max}$) kernel, with the last column of weights set to zeros. In one embodiment, when a running sum is used to compute the linear index, the low two bits are r and the remaining bits are s.

Each r,s,k position for a weight or (x,y) position for an input activation may be calculated using the position coordinates of the previous weight or input activation, respectively. The weight position calculation is shown in TABLE 11, where "value" is the zero-count.

TABLE 11

| Pseudo-code for position calculations |
| --- |
| if (type == 'R') then |
|     position.r = last_position.r + value + 1 ; |
|     position.s = last_position.s ; |
|     position.k = last_position.k ; // weights only |
|     wrap( ) ; // optional |
| else if (type == 'S') then |
|     position.r = value ; |
|     position.s = last_position.s + 1 ; |
|     position.k = last_position.k ; // weights only |
|     wrap( ) ; // optional |

TABLE 11-continued

Pseudo-code for position calculations

```
    else if (type == 'K') then
        position.r = value ;
        position.s = 0 ;
        position.k = last_position.k + 1 ; // weights only
    endif
```

An r coordinate type (R) encodes the zero-count, i.e., the number of zeros between the last non-zero element and the current non-zero element. When a running sum in each dimension (e.g., position.r and position.s) exceeds the maximum r dimension value ($r_{max}$), the position can be optionally wrapped—incrementing y and reducing r by the $r_{max}$. The y coordinate type (S) increments the s coordinate of the position by one and sets the r position to the value. The k coordinate type (K) increments the k coordinate of the position, resets s to zero, and sets r to the value. The wrap procedure is shown in TABLE 12, where max_r is $r_{max}$ and max_s is $s_{max}$.

TABLE 12

Pseudo-code for the position calculations with wrapping

```
if (position.r > max_r) then // max_r is max_r_weight or max_x_ia
    position.s = position.s + Truncate(position.r/max_r) ;
    position.r = position.r % max_r ;
endif
if (position.s > max_s) then // only applies to weights, max_s is
max_s_weight
    position.k = position.k + Truncate(position.s/max_s) ;
    position.s = position.s % max_s ;
endif
```

Wrapping can potentially lead to denser encodings—by providing more encoding options. However, supporting wrapping requires more complex decoding circuitry to perform divides and modulo operations. An intermediate option is to perform wrapping but to restrict $r_{max}$ and $s_{max}$ to be powers of two—simplifying the divide and modulo to shift and mask operations, respectively. Alternatively the wrap can be omitted and the appropriate coordinate type is required to advance the s or k coordinate. The (r,s,k) coordinates may be replaced with (x,y) coordinates, omitting k, to perform the position calculations for input activations.

In one embodiment, the weights may be represented as direct 16-bit or 8-bit values paired with a variable bit-width "code" value that is used to index a "codebook" to read the associated zero-count. Different codebooks may be used by different tiles. The encoding of the coordinate type and zero-count value should be done in a manner that maximizes encoding efficiency by providing more encodings for more common coordinate types and zero-count values.

FIG. 4C illustrates a coding scheme for weights and input activations (IA), in accordance with one embodiment. A 4-bit code indicates the coordinate type and zero-count value. Other coding schemes are possible and a coding scheme may use more or less than four bits. The weight codes have R, S, and K coordinate types while the activation codes have only X and Y coordinate types. For the weights, a larger number of codes (10) are devoted to the R coordinate type because it is most commonly used. The increment between values need not be one. For example, the zero-count values of R9 and X9 are not included to allow more "reach" between non-zero elements. Nine zeros between two non-zero elements can be encoded as an R4 (or X4) appended to R4 (or X4) with a zero weight value padded between the two runs of zeros. For the activation coding, a more aggressive coding of long runs of zeros is allowed with large increment gaps between codes.

As groups of F weights and I input activations are read from the weight buffer 305 and input activations buffer 310 each cycle, the position portion of the weights and input activations read from the buffers 315 and 320, respectively, are decoded from the 4-bit values shown in the table shown in FIG. 4C to full positions (x, y) for activations and (r,s,k) for weights. As previously explained, the F×I multiplier array 325 takes F weights and I input activations and produces P=F*I products. Each product is associated with a position that is computed by the destination calculation unit 330. For all product-position pairs, the non-zero weight and input activation values in compressed-sparse format are multiplied without expansion. The position portion of the compressed-sparse format includes zero-counts that are decoded into (r,s,k) for each weight and (x,y) for each input activation and then added to produce an (x,y,k) position for the corresponding product. The product-position computation is shown earlier in TABLE 5.

FIG. 4D illustrates weight values for four 3×3 convolution kernels 435, in accordance with one embodiment. FIG. 4E illustrates an encoding 440 of the positions for the weight values in the four 3×3 convolution kernels 435, in accordance with one embodiment. The first row of the encoding 440 comprises a stream of 12 codes, one for each non-zero weight value in the four 3×3 convolution kernels 435. With wrapping and $r_{max}=s_{max}=3$, the positions are encoded in the first row of the encoding 440. The first S1 corresponds to the zero in the upper left position that is followed by a 3. Following the first S1, S4 corresponds to the zero in the first row following the 3 and the three zeros in the second row of the first convolution kernel. Following the S4, a second S1 corresponds to the one zero in the third row of the first convolution kernel between the 4 and 5. Following the second S1 are two S0s corresponding to the lack of zeros between 5 and 6 and between 6 and 7 in the first row of the second convolution kernel. Following the two S0s is an S5 corresponding to the five zeros before the 8 in the third row of the second convolution kernel. The remaining codes can be derived in a similar fashion.

The second row of the encoding 440 shown in FIG. 4E illustrates the positions for the non-zero weight values in the four 3×3 convolution kernels 435. The positions may be determined based on the codes in the first row. Starting from an initial position of (0,0,0), the first S1 is decoded into the position (r,s,k)=(1,0,0) shown in the second row that corresponds to the position of the weight value of 3 in the first row of the first convolution kernel. The first S4 is decoded into the position (r,s,k)=(0,2,0) shown in the second row that corresponds to the position of the weight value of 4 in the third row of the first convolution kernel. The remaining positions can be derived in a similar fashion.

In one embodiment, linear indices are derived for the codes in the top row of the encoding 440 by computing a running sum starting at −1 and adding one for each weight value along with the zero-count value. Extracting the zero-counts from the top row produces {1,4,1,0,0,5,2,1,1,1,4,1}. If $r_{max}$ is set to 4 instead of 3 (for a convolution kernel that is 4×3 instead of 3×3), the zero-counts become {1,6,1,0,0, 7,3,2,1,2,6,1}. The zero-counts are then converted to a running sum, starting at −1 and adding one to each position for each of the corresponding weights. The running sum that is a linear index $L_i$ of the zero-counts C, is {1,8,10,11,12, 20,24,27,29,32,39,41}, where $L_i = L_{i-1} + C_i + 1$ and $L_0 = -1$. The linear index is then converted to position coordinates (r,s,k).

When $r_{max}$ is set to 4 (or another power of 2 value), r can be extracted by just removing the low two bits. A division by 3 is required to separate k and s from the remaining bits. The division may be avoided by rounding the kernel dimensions to 4×4 (or another power of 2 value in each dimension), the compressed-sparse coding may not be as dense due to the extra zeros. Note that the k coordinate in the (r,s,k) position is not the absolute address of the output channel, but rather the temporary address of the accumulator currently holding the output channel. The positions extracted from the linear index are shown in the second row of the encoding 440.

Figure 4F:
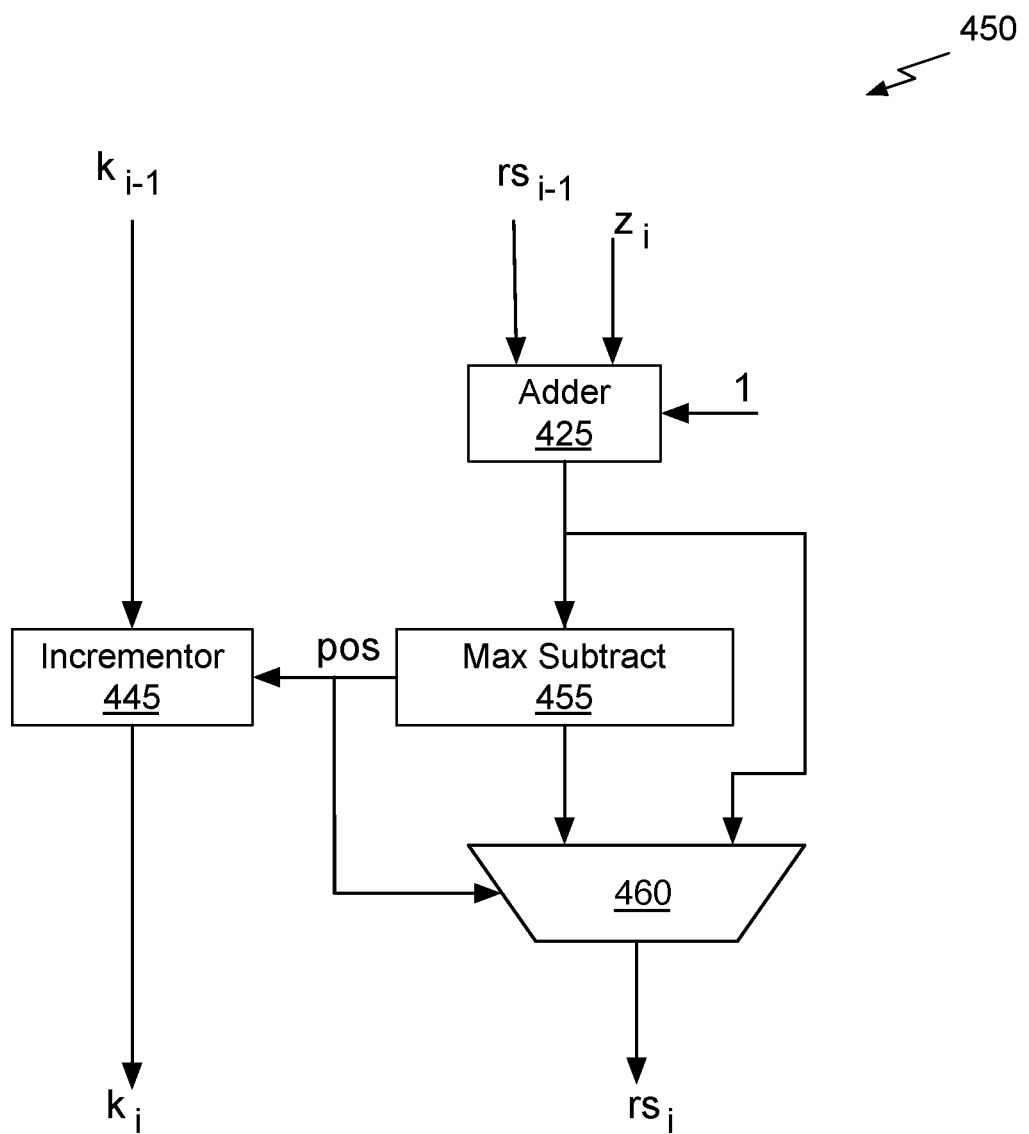
FIG. 4F shows a block diagram for determining the (r,s) weight coordinates, in accordance with one embodiment.

FIG. 4F shows a block diagram 450 for determining the (r,s,k) weight coordinates, in accordance with one embodiment. $r_{max}$ is assumed to be small (smaller than the maximum zero-count) and is therefore rounded up to a power of two, so that the r and s coordinates can be handled as a single field rs with the low bits being r and the high bits being s. An adder 425 sums a zero-count, $z_i$ and 1 with $rs_{i-1}$ to produce a tentative $rs_i$. The division operation to separate k and s does not actually require a divide, but may instead be performed using a running divide technique. At each step, computing the running sum, the tentative $rs_i$ may be compared to $rs_{max}=r_{max}*s_{max}$. If the sum is greater than or equal to $rs_{max}$, $rs_{max}$ is subtracted from the tentative $rs_i$ and k is incremented. The running divide technique may be used to separate r and s when $r_{max}$ is not rounded up to the next power of two.

A max subtract 455 subtracts $rs_{max}$ from the tentative $rs_i$ value output by the adder 425 and determines if the result is positive as indicated by the pos signal output by the max subtract 455. If the result is positive, the result of the subtraction is retained and selected for output as $rs_i$ by a multiplexor 460. If the result is not positive, the multiplexer 460 selects the tentative $rs_i$ for output as $rs_i$. An incrementor 445 receives $k_{i-1}$ and increments $k_{i-1}$ to update the output $k_i$ when the result is positive. Note that if $rs_{max}$ is smaller than the maximum zero-count, it may be necessary to compare against $2*rs_{max}$, and other multiples. However, when $rs_{max}$ is that small, in one embodiment, $rs_{max}$ is rounded up to the next power of 2 and a running sum should be computed on a combined krs field.

In one embodiment, the encoding for input activations is the same as for weights except that the (r,s) coordinates are replaced with (x,y) coordinates and the k coordinate is omitted. However the size of an input activation slice may be considerably larger. For a high definition (HD) image size of 1920×1080 pixels distributed into an 8×8 array of PEs 210, each PE 210 will hold a 240×135 slice. At the other extreme, a deep convolutional layer may be only 14×14 having an $x_{max}$ of just 1 or 2. When large sizes are too large to be rounded up to powers of 2, input activations may employ the running divide technique to separate x, y, and k.

Figure 4G:
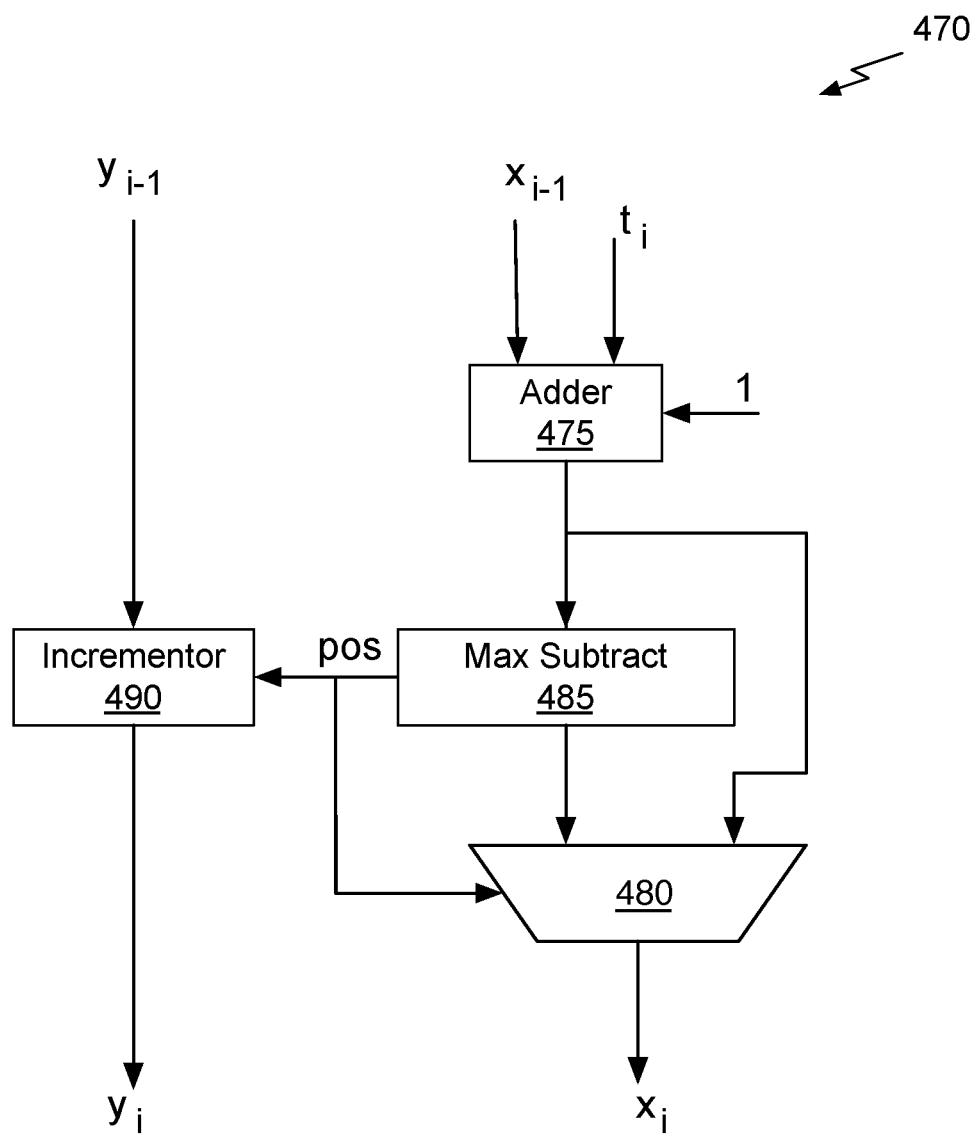
FIG. 4G shows a block diagram for determining the (x,y) input activation coordinates, in accordance with one embodiment.

FIG. 4G shows a block diagram 470 for determining the (x,y) input activation coordinates, in accordance with one embodiment. The calculation used for the input activation coordinates is similar to calculating the weight coordinates except that: (1) there is no k field and the positions are all from the same input channel c; and (2) the x coordinate is compared to $x_{max}$ at each step and, if needed, $x_{max}$ is subtracted. For input activations, $x_{max}$ can become large, making it costly to round up to the next power of two.

An adder 475 sums a zero-count, $t_i$ and 1 with $x_{i-1}$ to produce a tentative $x_i$. A max subtract 485 subtracts $x_{max}$ from the tentative $x_i$ value output by the adder 475 and determines if the result is positive as indicated by the pos signal output by the max subtract 485. If the result is positive, the result of the subtraction is retained and selected for output as $x_i$ by a multiplexor 480. If the result is not positive, the multiplexer 480 selects the tentative $x_i$ for output as $x_i$. An incrementor 490 receives $y_{i-1}$ and increments $y_{i-1}$ to update the output $y_i$ when the result is positive.

Note that the input activation coordinate system is tied to the halo such that, for a 3×3 convolution kernel, the current input activations start at (1,1). Once the (r,s,k) positions of the weights are computed and the (x,y) positions of the input activations are computed by the destination calculation unit 330, the r and x coordinates are summed and the s and y coordinates are summed by the destination calculation unit 330 to compute the output activation positions in (x,y,k) form. The destination calculation unit 330 then converts the output activation positions to a linear accumulator address according to:

$$address_i = x + y*x_{max\_halo} + k*x_{max\_halo}*y_{max\_halo}$$

Note that $x_{max\_halo}$ and $y_{max\_halo}$ refer to the dimensions of the halo and (x,y,k) is the output activation position. The values being multiplied by y and k can be rounded up, if needed, to reduce the cost of the multiply. However the rounding may increase the cost of the accumulators in terms of extra operations that are not necessary.

FIG. 5A illustrates a non-linear coding scheme 505 for input activation zero-count values, in accordance with one embodiment. One technique for reducing the cost of rounding up $x_{max}$ (or $xy_{max}$) to the next power of two is to space the zero-count symbols non-linearly. The first row of the coding scheme 505 is the four-bit code and the second row is the corresponding zero-count value. The first eight codes encode linear zero-counts from 0 to 7 as was described in conjunction with FIG. 4C. The next eight codes, however encode larger, non-linear zero-count values (e.g., 12, 18, 16, 24, 32, 48, 64, 96, and 128) to "jump around" the large empty region produced by rounding up $x_{max}$. For example, if $x_{max}$ is 129 and is rounded up to 256, it may be necessary to jump by 128.

FIG. 5B illustrates another coding scheme 510 for input activation zero-count values, in accordance with one embodiment. The coding scheme 510 allows the zero-count to specify that the x-coordinate should be set to the specified value and that the y-coordinate should be incremented. As in the coding scheme 505, the first eight codes specify zero-counts of 0 to 7. The next eight codes, of the form Yn, instruct the destination calculation unit 330 to increment the y coordinate and set the x coordinate to x=n. With this form of encoding, there is no need to first convert to a linear index. The zero-count codes can be directly converted to (x,y).

FIG. 5C illustrates another coding scheme 515 for input activation zero-count values, in accordance with one embodiment. Because most cases do not increment Y, it makes sense to have more "normal" codes than "Y-increment codes". Therefore, the coding scheme 510 includes 11 codes that allow the zero-count to specify that the x-coordinate should be set to the specified value and includes 5 codes for incrementing the y-coordinate.

FIG. 5D illustrates another coding scheme 520 for weight zero-count values, in accordance with one embodiment. For weights the non-zero values are encoded in a three-dimensional r,s,k space, so $r_{max}$ may be rounded up to the next power of two and jumps to the next channel k are encoded with distinguished zero-count values. The coding scheme 520 allows the zero-count to specify that the r-coordinate should be set to the specified value and that the k-coordinate should be incremented. The first fourteen codes specify zero-counts of 0 to 13. The last two codes, of the form Kn, instruct the destination calculation unit 330 to zero rs and skip to the next output channel k.

FIG. 5E illustrates another coding scheme 525 for weight zero-count values, in accordance with one embodiment. The coding scheme 525 allows the zero-count to specify that the r-coordinate should be set to the specified value and that either the s-coordinate or the k-coordinate should be incremented. The first ten codes specify zero-counts of 0 to 9. The next three codes, of the form Sn, instruct the destination calculation unit 330 to zero r and increment s. The last two codes, of the form Kn, instruct the destination calculation unit 330 to zero r and s and increment k.

As shown in FIG. 5A-5E, the compressed-sparse format may encode the non-zero weights and input activations as dense vectors of values along with a skip-encoded (i.e., nonlinear) vector of codes representing the position, where z is the value. In one embodiment, one or more codes may specify one of (i) add z+1 to the last coordinate, wrapping in r, s, and/or k as appropriate (r=r+z+1, wrap), (ii) skip to the next row (s=s+1, x=z, wrap), or (iii) skip to the next channel (k=k+1, s=0, r=z, wrap).

Previous efforts to exploit sparsity in CNN accelerators have focused on reducing energy or saving time, which will invariably also save energy Eliminating the multiplication when an input operand is zero by gating an operand input to a multiplier is a natural way to save energy. Gating an operand will save energy, but the number of processing cycles will not be reduced. The SCNN accelerator 200 also saves energy by eliminating all the unnecessary multiplications, and when any input operand is zero the circuitry is not even prepared to perform a multiplication operation, thus saving time as well.

An additional approach to reducing energy is to reduce data transfer costs when the data is sparse. The input activations may be compressed for transfer to and from DRAM to save energy (and time) by reducing the number of DRAM accesses. However, conventional systems expand the compressed input activations before the input activations are loaded into an on-chip buffer, so the input activations are stored in expanded form. Thus, there is no savings on transfers from one internal buffer to another internal buffer or to the multipliers. In contrast, the SCNN accelerator 200 uses a compressed representation for all data coming from DRAM, and maintains the compressed representation in the on-die buffers. In contrast, SCNN accelerator 200 keeps both weights and activations in a compressed form in both DRAM and internal buffers. This saves data transfer time and energy on all data transfers and allows the chip to hold larger models for a given amount of internal storage.

The SCNN accelerator 200 exploits sparsity in both weights and activations using the sparse planar-tiled input-stationary (PTIS-sparse) dataflow. The PTIS-sparse dataflow enables the SCNN accelerator 200 to use a novel Cartesian product-based computation architecture that maximizes reuse of weights and input activations within a set of distributed PEs 210. In addition, the PTIS-sparse dataflow allows the use of a dense compressed-sparse encoding for both weights and activations to be used through almost the entire processing flow. The amount of data that is transferred within the SCNN accelerator 200 is reduced and the amount of on-die storage capacity is effectively increased. Results show that for an equivalent area, the SCNN accelerator 200 architecture achieves higher energy efficiency compared with an energy-optimized dense architecture when the weights and activations are each less than 85% dense. On three contemporary networks the SCNN accelerator 200 architecture achieves performance improvements over the dense architecture by a factor of 2.6 times while still being energy-efficient by a factor of 2.5 times.

Parallel Processing Architecture

Figure 6:
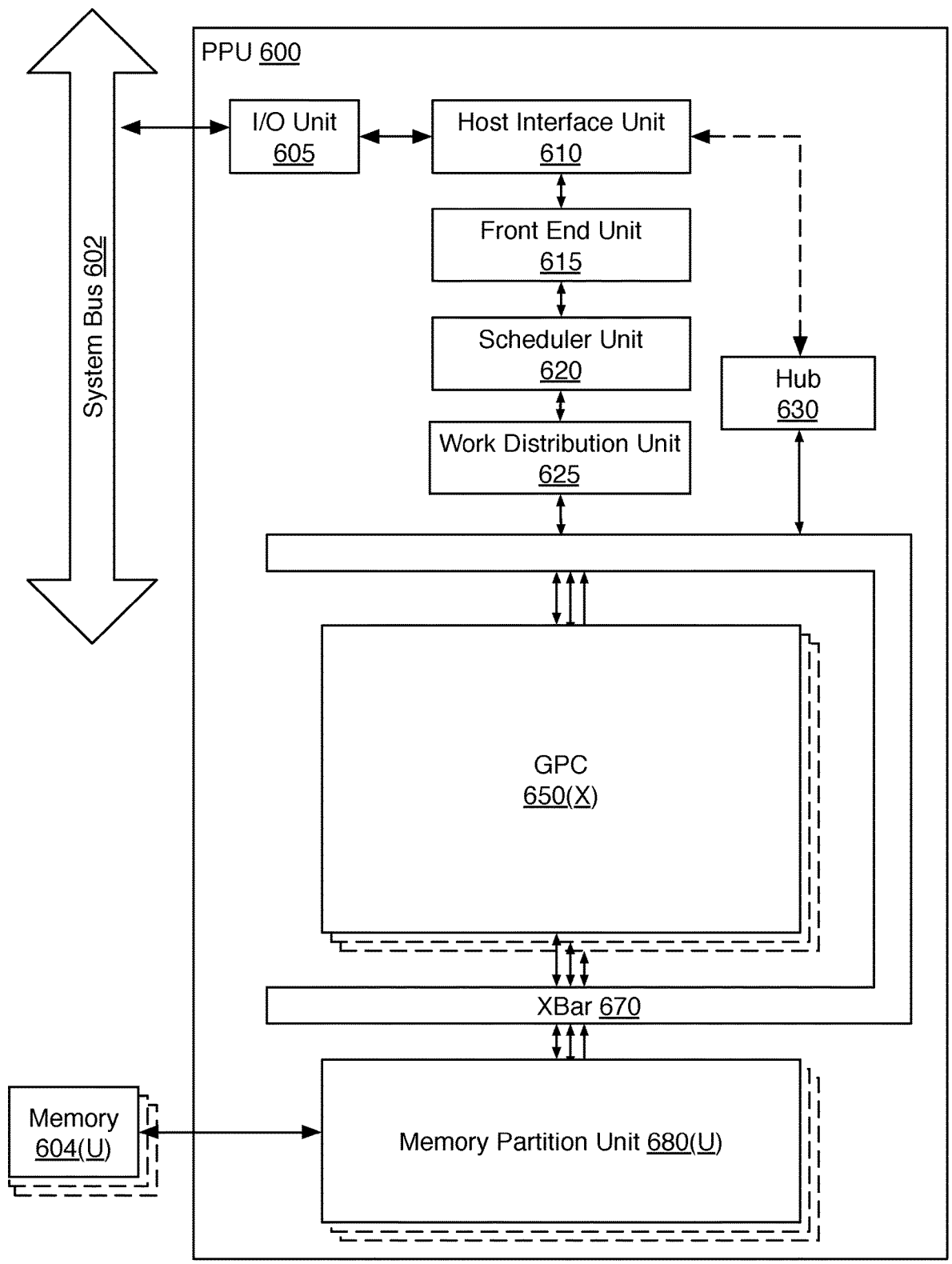
FIG. 6 illustrates a parallel processing unit, in accordance with one embodiment.

FIG. 6 illustrates a parallel processing unit (PPU) 600, in accordance with one embodiment. The PPU 600 may be configured to perform the operations of the SCNN accelerator 200 and/or implement the method 100 shown in FIG. 1 and method 400 shown in FIG. 4A. In one embodiment, the PPU 600 is a multi-threaded processor that is implemented on one or more integrated circuit devices. The PPU 600 is a latency hiding architecture designed to process a large number of threads in parallel. A thread (i.e., a thread of execution) is an instantiation of a set of instructions configured to be executed by the PPU 600. In one embodiment, the PPU 600 is a graphics processing unit (GPU) configured to implement a graphics rendering pipeline for processing three-dimensional (3D) graphics data in order to generate two-dimensional (2D) image data for display on a display device such as a liquid crystal display (LCD) device. In one embodiment, the PPU 600 is a GPU configured to implement CNN and/or DNN operations. As described in conjunction with FIGS. 9A, and 9B, a set of instructions may be provided for implementing the operations performed by the PEs 210. In other embodiments, the PPU 600 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

As shown in FIG. 6, the PPU 600 includes an Input/Output (I/O) unit 605, a host interface unit 610, a front end unit 615, a scheduler unit 620, a work distribution unit 625, a hub 630, a crossbar (Xbar) 670, one or more general processing clusters (GPCs) 650, and one or more partition units 680. The PPU 600 may be connected to a host processor or other peripheral devices via a system bus 602. The PPU 600 may also be connected to a local memory comprising a number of memory devices 604. In one embodiment, the local memory may comprise a number of dynamic random access memory (DRAM) devices.

The I/O unit 605 is configured to transmit and receive communications (i.e., commands, data, etc.) from a host processor (not shown) over the system bus 602. The I/O unit 605 may communicate with the host processor directly via the system bus 602 or through one or more intermediate devices such as a memory bridge. In one embodiment, the I/O unit 605 implements a Peripheral Component Interconnect Express (PCIe) interface for communications over a PCIe bus. In alternative embodiments, the I/O unit 605 may implement other types of well-known interfaces for communicating with external devices.

The I/O unit 605 is coupled to a host interface unit 610 that decodes packets received via the system bus 602. In one embodiment, the packets represent commands configured to cause the PPU 600 to perform various operations. The host interface unit 610 transmits the decoded commands to various other units of the PPU 600 as the commands may specify. For example, some commands may be transmitted to the front end unit 615. Other commands may be transmitted to the hub 630 or other units of the PPU 600 such as one or more copy engines, a video encoder, a video decoder, a power management unit, etc. (not explicitly shown). In other words, the host interface unit 610 is configured to route communications between and among the various logical units of the PPU 600.

In one embodiment, a program executed by the host processor encodes a command stream in a buffer that provides workloads to the PPU 600 for processing. A workload may comprise a number of instructions and data to be processed by those instructions. The buffer is a region in a memory that is accessible (i.e., read/write) by both the host processor and the PPU 600. For example, the host interface unit 610 may be configured to access the buffer in a system memory connected to the system bus 602 via memory requests transmitted over the system bus 602 by the I/O unit 605. In one embodiment, the host processor writes the command stream to the buffer and then transmits a pointer to the start of the command stream to the PPU 600. The host interface unit 610 provides the front end unit 615 with pointers to one or more command streams. The front end unit 615 manages the one or more streams, reading commands from the streams and forwarding commands to the various units of the PPU 600.

The front end unit 615 is coupled to a scheduler unit 620 that configures the various GPCs 650 to process tasks defined by the one or more streams. The scheduler unit 620 is configured to track state information related to the various tasks managed by the scheduler unit 620. The state may indicate which GPC 650 a task is assigned to, whether the task is active or inactive, a priority level associated with the task, and so forth. The scheduler unit 620 manages the execution of a plurality of tasks on the one or more GPCs 650.

The scheduler unit 620 is coupled to a work distribution unit 625 that is configured to dispatch tasks for execution on the GPCs 650. The work distribution unit 625 may track a number of scheduled tasks received from the scheduler unit 620. In one embodiment, the work distribution unit 625 manages a pending task pool and an active task pool for each of the GPCs 650. The pending task pool may comprise a number of slots (e.g., 32 slots) that contain tasks assigned to be processed by a particular GPC 650. The active task pool may comprise a number of slots (e.g., 4 slots) for tasks that are actively being processed by the GPCs 650. As a GPC 650 finishes the execution of a task, that task is evicted from the active task pool for the GPC 650 and one of the other tasks from the pending task pool is selected and scheduled for execution on the GPC 650. If an active task has been idle on the GPC 650, such as while waiting for a data dependency to be resolved, then the active task may be evicted from the GPC 650 and returned to the pending task pool while another task in the pending task pool is selected and scheduled for execution on the GPC 650.

The work distribution unit 625 communicates with the one or more GPCs 650 via XBar 670. The XBar 670 is an interconnect network that couples many of the units of the PPU 600 to other units of the PPU 600. For example, the XBar 670 may be configured to couple the work distribution unit 625 to a particular GPC 650. Although not shown explicitly, one or more other units of the PPU 600 are coupled to the host interface unit 610. The other units may also be connected to the XBar 670 via a hub 630.

The tasks are managed by the scheduler unit 620 and dispatched to a GPC 650 by the work distribution unit 625. The GPC 650 is configured to process the task and generate results. The results may be consumed by other tasks within the GPC 650, routed to a different GPC 650 via the XBar 670, or stored in the memory 604. The results can be written to the memory 604 via the partition units 680, which implement a memory interface for reading and writing data to/from the memory 604. In one embodiment, the PPU 600 includes a number U of partition units 680 that is equal to the number of separate and distinct memory devices 604 coupled to the PPU 600. A partition unit 680 will be described in more detail below in conjunction with FIG. 7B.

In one embodiment, a host processor executes a driver kernel that implements an application programming interface (API) that enables one or more applications executing on the host processor to schedule operations for execution on the PPU 600. An application may generate instructions (i.e., API calls) that cause the driver kernel to generate one or more tasks for execution by the PPU 600. The driver kernel outputs tasks to one or more streams being processed by the PPU 600. Each task may comprise one or more groups of related threads, referred to herein as a warp. A thread block may refer to a plurality of groups of threads including instructions to perform the task. Threads in the same group of threads may exchange data through shared memory. In one embodiment, a group of threads comprises 32 related threads.

Figure 7A:
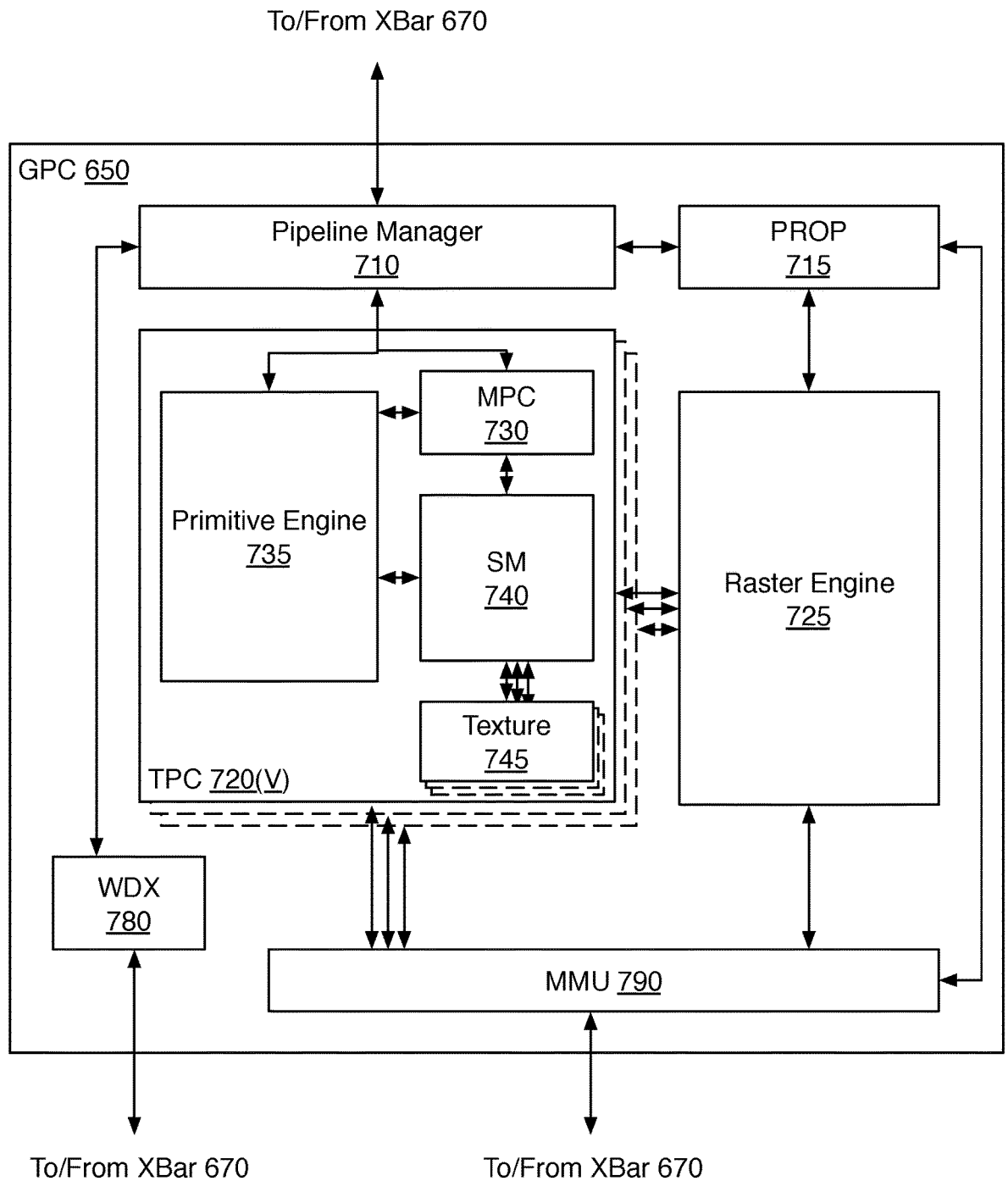
FIG. 7A illustrates a general processing cluster of the parallel processing unit of FIG. 6, in accordance with one embodiment.

FIG. 7A illustrates a GPC 650 of the PPU 600 of FIG. 6, in accordance with one embodiment. As shown in FIG. 7A, each GPC 650 includes a number of hardware units for processing tasks. In one embodiment, each GPC 650 includes a pipeline manager 710, a pre-raster operations unit (PROP) 715, a raster engine 725, a work distribution crossbar (WDX) 780, a memory management unit (MMU) 790, and one or more Texture Processing Clusters (TPCs) 720. It will be appreciated that the GPC 650 of FIG. 7A may include other hardware units in lieu of or in addition to the units shown in FIG. 7A.

In one embodiment, the operation of the GPC 650 is controlled by the pipeline manager 710. The pipeline manager 710 manages the configuration of the one or more TPCs 720 for processing tasks allocated to the GPC 650. In one embodiment, the pipeline manager 710 may configure at least one of the one or more TPCs 720 to implement at least a portion of a graphics rendering pipeline. For example, a TPC 720 may be configured to execute a vertex shader program on the programmable streaming multiprocessor (SM) 740. The pipeline manager 710 may also be configured to route packets received from the work distribution unit 625 to the appropriate logical units within the GPC 650. For example, some packets may be routed to fixed function hardware units in the PROP 715 and/or raster engine 725 while other packets may be routed to the TPCs 720 for processing by the primitive engine 735 or the SM 740.

The PROP unit 715 is configured to route data generated by the raster engine 725 and the TPCs 720 to a Raster Operations (ROP) unit in the partition unit 680, described in more detail below. The PROP unit 715 may also be configured to perform optimizations for color blending, organize pixel data, perform address translations, and the like.

The raster engine 725 includes a number of fixed function hardware units configured to perform various raster operations. In one embodiment, the raster engine 725 includes a setup engine, a course raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x,y coverage mask for a tile) for the primitive. The output of the coarse raster engine may transmitted to the culling engine where fragments associated with the primitive that fail a z-test are culled, and transmitted to a clipping engine where fragments lying outside a viewing frustum are clipped. Those fragments that survive clipping and culling may be passed to a fine raster engine to generate attributes for the pixel fragments based on the plane equations generated by the setup engine. The output of the raster engine 725 comprises fragments to be processed, for example, by a fragment shader implemented within a TPC 720.

Each TPC 720 included in the GPC 650 includes an M-Pipe Controller (MPC) 730, a primitive engine 735, one or more SMs 740, and one or more texture units 745. The MPC 730 controls the operation of the TPC 720, routing packets received from the pipeline manager 710 to the appropriate units in the TPC 720. For example, packets associated with a vertex may be routed to the primitive engine 735, which is configured to fetch vertex attributes associated with the vertex from the memory 604. In contrast, packets associated with a shader program may be transmitted to the SM 740.

In one embodiment, the texture units 745 are configured to load texture maps (e.g., a 2D array of texels) from the memory 604 and sample the texture maps to produce sampled texture values for use in shader programs executed by the SM 740. The texture units 745 implement texture operations such as filtering operations using mip-maps (i.e., texture maps of varying levels of detail). The texture unit 745 is also used as the Load/Store path for SM 740 to MMU 790. In one embodiment, each TPC 720 includes two (2) texture units 745.

The SM 740 comprises a programmable streaming processor that is configured to process tasks represented by a number of threads. Each SM 740 is multi-threaded and configured to execute a plurality of threads (e.g., 32 threads) from a particular group of threads concurrently. In one embodiment, the SM 740 implements a SIMD (Single-Instruction, Multiple-Data) architecture where each thread in a group of threads (i.e., a warp) is configured to process a different set of data based on the same set of instructions. All threads in the group of threads execute the same instructions. In another embodiment, the SM 740 implements a SIMT (Single-Instruction, Multiple Thread) architecture where each thread in a group of threads is configured to process a different set of data based on the same set of instructions, but where individual threads in the group of threads are allowed to diverge during execution. In other words, when an instruction for the group of threads is dispatched for execution, some threads in the group of threads may be active, thereby executing the instruction, while other threads in the group of threads may be inactive, thereby performing a no-operation (NOP) instead of executing the instruction. The SM 740 may be described in more detail below in conjunction with FIG. 8.

The MMU 790 provides an interface between the GPC 650 and the partition unit 680. The MMU 790 may provide translation of virtual addresses into physical addresses, memory protection, and arbitration of memory requests. In one embodiment, the MMU 790 provides one or more translation lookaside buffers (TLBs) for improving translation of virtual addresses into physical addresses in the memory 604.

Figure 7B:
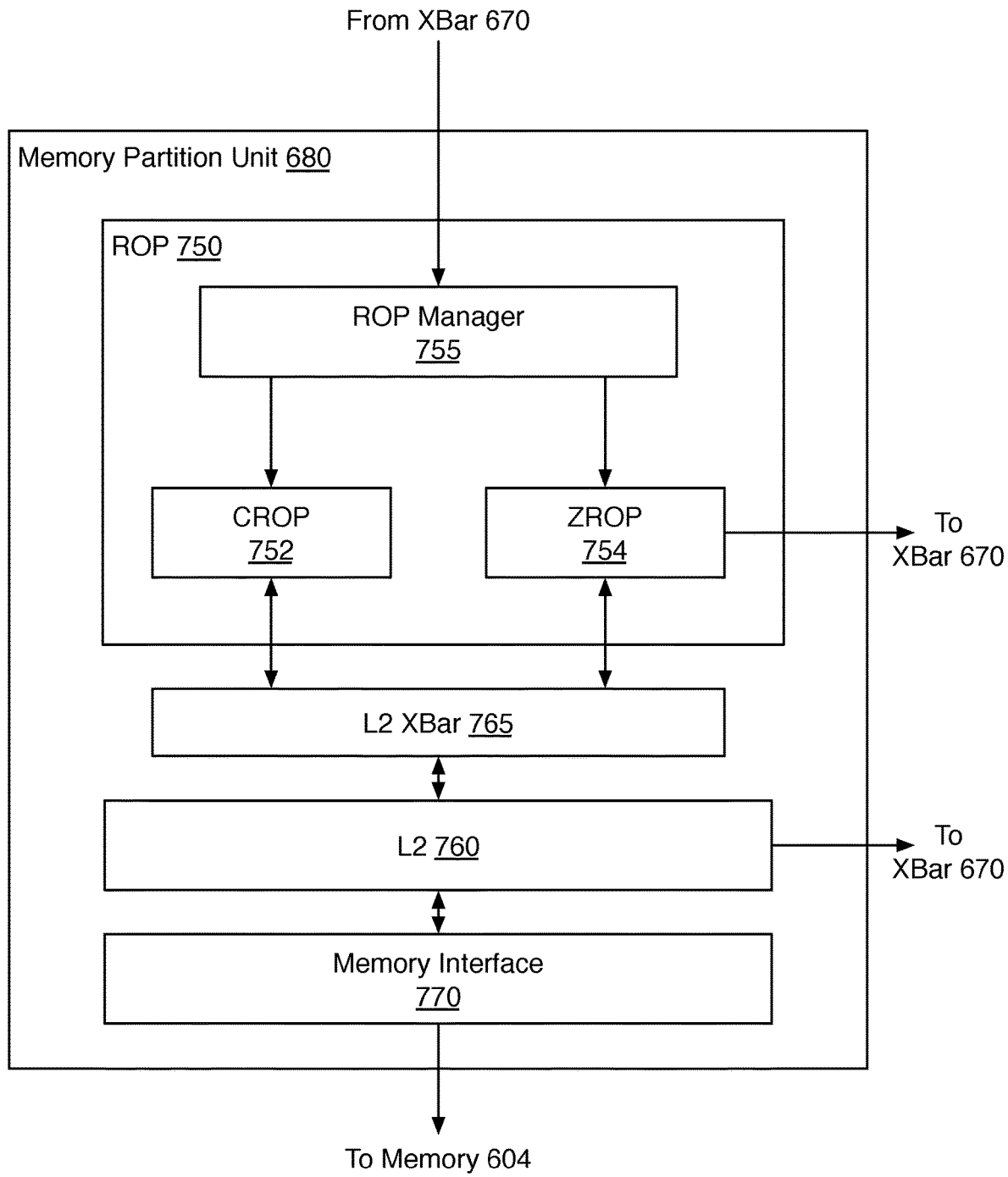
FIG. 7B illustrates a partition unit of the parallel processing unit of FIG. 6, in accordance with one embodiment.

FIG. 7B illustrates a memory partition unit 680 of the PPU 600 of FIG. 6, in accordance with one embodiment. As shown in FIG. 7B, the memory partition unit 680 includes a Raster Operations (ROP) unit 750, a level two (L2) cache 760, a memory interface 770, and an L2 crossbar (XBar) 765. The memory interface 770 is coupled to the memory 604. Memory interface 770 may implement 16, 32, 64, 128-bit data buses, or the like, for high-speed data transfer. In one embodiment, the PPU 600 comprises U memory interfaces 770, one memory interface 770 per partition unit 680, where each partition unit 680 is connected to a corresponding memory device 604. For example, PPU 600 may be connected to up to U memory devices 604, such as graphics double-data-rate, version 5, synchronous dynamic random access memory (GDDR5 SDRAM). In one embodiment, the memory interface 770 implements a DRAM interface and U is equal to 8.

In one embodiment, the PPU 600 implements a multi-level memory hierarchy. The memory 604 is located off-chip in SDRAM coupled to the PPU 600. Data from the memory 604 may be fetched and stored in the L2 cache 760, which is located on-chip and is shared between the various GPCs 650. As shown, each partition unit 680 includes a portion of the L2 cache 760 associated with a corresponding memory device 604. Lower level caches may then be implemented in various units within the GPCs 650. For example, each of the SMs 740 may implement a level one (L1) cache. The L1 cache is private memory that is dedicated to a particular SM 740. Data from the L2 cache 760 may be fetched and stored in each of the L1 caches for processing in the functional units of the SMs 740. The L2 cache 760 is coupled to the memory interface 770 and the XBar 670.

The ROP unit 750 includes a ROP Manager 755, a Color ROP (CROP) unit 752, and a Z ROP (ZROP) unit 754. The CROP unit 752 performs raster operations related to pixel color, such as color compression, pixel blending, and the like. The ZROP unit 754 implements depth testing in conjunction with the raster engine 725. The ZROP unit 754 receives a depth for a sample location associated with a pixel fragment from the culling engine of the raster engine 725. The ZROP unit 754 tests the depth against a corresponding depth in a depth buffer for a sample location associated with the fragment. If the fragment passes the depth test for the sample location, then the ZROP unit 754 updates the depth buffer and transmits a result of the depth test to the raster engine 725. The ROP Manager 755 controls the operation of the ROP unit 750. It will be appreciated that the number of partition units 680 may be different than the number of GPCs 650 and, therefore, each ROP unit 750 may be coupled to each of the GPCs 650. Therefore, the ROP Manager 755 tracks packets received from the different GPCs 650 and determines which GPC 650 that a result generated by the ROP unit 750 is routed to. The CROP unit 752 and the ZROP unit 754 are coupled to the L2 cache 760 via an L2 XBar 765.

Figure 8:
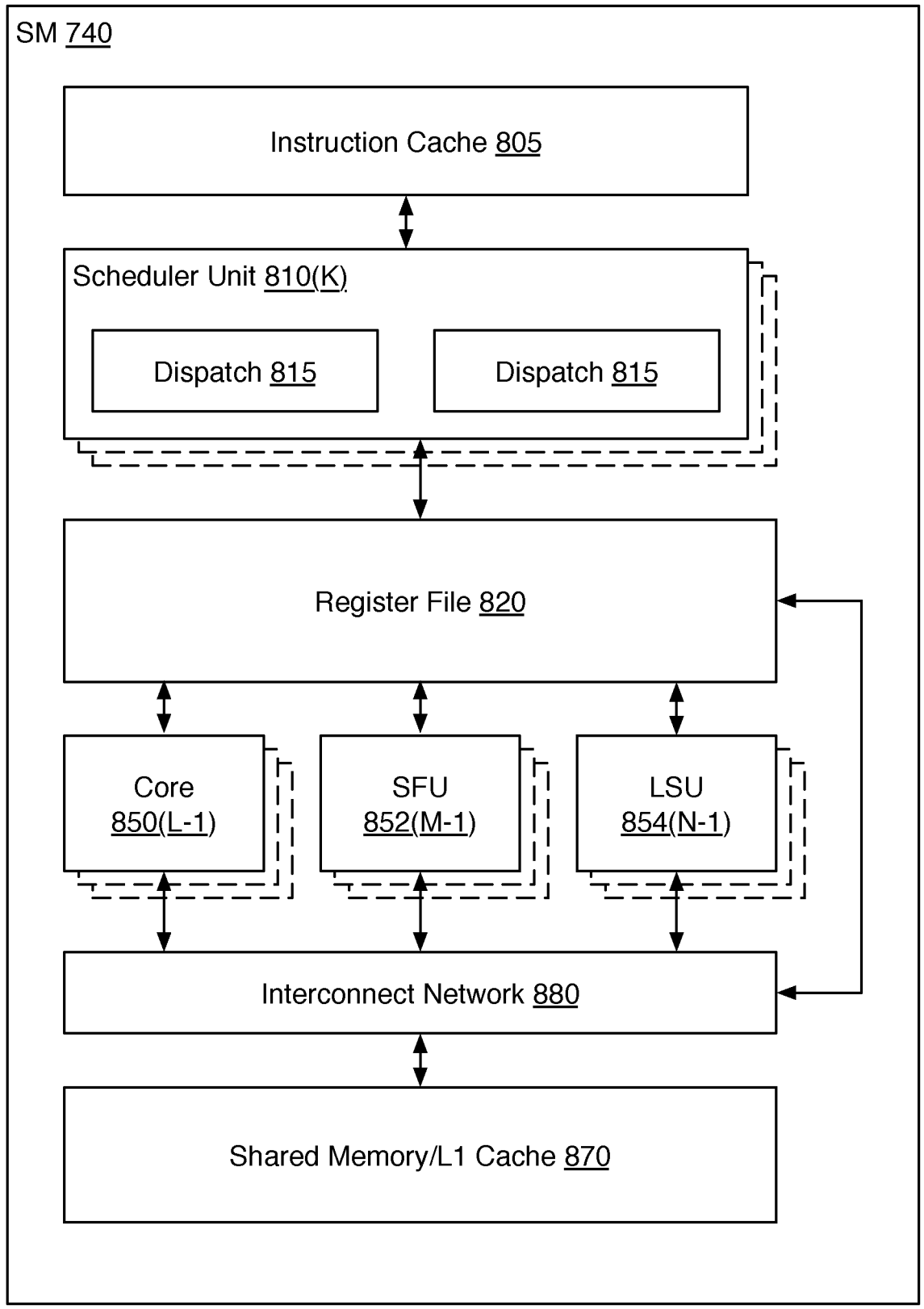
FIG. 8 illustrates the streaming multi-processor of FIG. 7A, in accordance with one embodiment.

FIG. 8 illustrates the streaming multi-processor 740 of FIG. 7A, in accordance with one embodiment. As shown in FIG. 8, the SM 740 includes an instruction cache 805, one or more scheduler units 810, a register file 820, one or more processing cores 850, one or more special function units (SFUs) 852, one or more load/store units (LSUs) 854, an interconnect network 880, a shared memory/L1 cache 870.

As described above, the work distribution unit 625 dispatches tasks for execution on the GPCs 650 of the PPU 600. The tasks are allocated to a particular TPC 720 within a GPC 650 and, if the task is associated with a shader program, the task may be allocated to an SM 740. The scheduler unit 810 receives the tasks from the work distribution unit 625 and manages instruction scheduling for one or more groups of threads (i.e., warps) assigned to the SM 740. The scheduler unit 810 schedules threads for execution in groups of parallel threads, where each group is called a warp. In one embodiment, each warp includes 32 threads. The scheduler unit 810 may manage a plurality of different warps, scheduling the warps for execution and then dispatching instructions from the plurality of different warps to the various functional units (i.e., cores 850, SFUs 852, and LSUs 854) during each clock cycle.

In one embodiment, each scheduler unit 810 includes one or more instruction dispatch units 815. Each dispatch unit 815 is configured to transmit instructions to one or more of the functional units. In the embodiment shown in FIG. 8, the scheduler unit 810 includes two dispatch units 815 that enable two different instructions from the same warp to be dispatched during each clock cycle. In alternative embodiments, each scheduler unit 810 may include a single dispatch unit 815 or additional dispatch units 815.

Each SM 740 includes a register file 820 that provides a set of registers for the functional units of the SM 740. In one embodiment, the register file 820 is divided between each of the functional units such that each functional unit is allocated a dedicated portion of the register file 820. In another embodiment, the register file 820 is divided between the different warps being executed by the SM 740. The register file 820 provides temporary storage for operands connected to the data paths of the functional units.

Each SM 740 comprises L processing cores 850. In one embodiment, the SM 740 includes a large number (e.g., 128, etc.) of distinct processing cores 850. Each core 850 may include a fully-pipelined, single-precision processing unit that includes a floating point arithmetic logic unit and an integer arithmetic logic unit. The core 850 may also include a double-precision processing unit including a floating point arithmetic logic unit. In one embodiment, the floating point arithmetic logic units implement the IEEE 754-2008 standard for floating point arithmetic. Each SM 740 also comprises M SFUs 852 that perform special functions (e.g., attribute evaluation, reciprocal square root, and the like), and N LSUs 854 that implement load and store operations between the shared memory/L1 cache 870 and the register file 820. In one embodiment, the SM 740 includes 128 cores 850, 32 SFUs 852, and 32 LSUs 854.

Each SM 740 includes an interconnect network 880 that connects each of the functional units to the register file 820 and the LSU 854 to the register file 820, shared memory/L1 cache 870. In one embodiment, the interconnect network 880 is a crossbar that can be configured to connect any of the functional units to any of the registers in the register file 820 and connect the LSUs 854 to the register file and memory locations in shared memory/L1 cache 870.

The shared memory/L1 cache 870 is an array of on-chip memory that allows for data storage and communication between the SM 740 and the primitive engine 735 and between threads in the SM 740. In one embodiment, the shared memory/L1 cache 870 comprises 64 KB of storage capacity and is in the path from the SM 740 to the partition unit 680. The shared memory/L1 cache 870 can be used to cache reads and writes.

The PPU 600 described above may be configured to perform highly parallel computations much faster than conventional CPUs. Parallel computing has advantages in graphics processing, data compression, biometrics, stream processing algorithms, and the like.

When configured for general purpose parallel computation, a simpler configuration can be used. In this model, as shown in FIG. 6, fixed function graphics processing units are bypassed, creating a much simpler programming model. In this configuration, the work distribution unit 625 assigns and distributes blocks of threads directly to the TPCs 720. The threads in a block execute the same program, using a unique thread ID in the calculation to ensure each thread generates unique results, using the SM 740 to execute the program and perform calculations, shared memory/L1 cache 870 communicate between threads, and the LSU 854 to read and write Global memory through partition shared memory/L1 cache 870 and partition unit 680. When configured for general purpose parallel computation, the SM 740 can also write commands that scheduler unit 620 can use to launch new work on the TPCs 720.

In one embodiment, the PPU 600 comprises a graphics processing unit (GPU). The PPU 600 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 600 can be configured to process the graphics primitives to generate a frame buffer (i.e., pixel data for each of the pixels of the display).

An application writes model data for a scene (i.e., a collection of vertices and attributes) to a memory such as a system memory or memory 604. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the SMs 740 of the PPU 600 including one or more of a vertex shader, hull shader, domain shader, geometry shader, and a pixel shader. For example, one or more of the SMs 740 may be configured to execute a vertex shader program that processes a number of vertices defined by the model data. In one embodiment, the different SMs 740 may be configured to execute different shader programs concurrently. For example, a first subset of SMs 740 may be configured to execute a vertex shader program while a second subset of SMs 740 may be configured to execute a pixel shader program. The first subset of SMs 740 processes vertex data to produce processed vertex data and writes the processed vertex data to the L2 cache 760 and/or the memory 604. After the processed vertex data is rasterized (i.e., transformed from three-dimensional data into two-dimensional data in screen space) to produce fragment data, the second subset of SMs 740 executes a pixel shader to produce processed fragment data, which is then blended with other processed fragment data and written to the frame buffer in memory 604. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

The PPU 600 may be included in a desktop computer, a laptop computer, a tablet computer, a smart-phone (e.g., a wireless, hand-held device), personal digital assistant (PDA), a digital camera, a hand-held electronic device, and the like. In one embodiment, the PPU 600 is embodied on a single semiconductor substrate. In another embodiment, the PPU 600 is included in a system-on-a-chip (SoC) along with one or more other logic units such as a reduced instruction set computer (RISC) CPU, a memory management unit (MMU), a digital-to-analog converter (DAC), and the like.

In one embodiment, the PPU 600 may be included on a graphics card that includes one or more memory devices 604 such as GDDR5 SDRAM. The graphics card may be configured to interface with a PCIe slot on a motherboard of a desktop computer that includes, e.g., a northbridge chipset and a southbridge chipset. In yet another embodiment, the PPU 600 may be an integrated graphics processing unit (iGPU) included in the chipset (i.e., Northbridge) of the motherboard.

Various programs may be executed within the PPU 600 in order to perform the operations of the SCNN Accelerator 200. For example, the device driver may launch a kernel on the PPU 600 to perform the operations of one PE 210 on one SM 740 (or multiple SMs 740). The device driver (or the initial kernel executed by the PPU 600) may also launch other kernels on the PPU 600 to perform other CNN or DNN operations.

Primitive Operations

While the SCNN accelerator 200 architecture is designed to execute sparse CNNs and DNNs, a sparse CNN or DNN may also be executed using a GPU that supports specific primitive operations, such as the PPU 600. In one embodiment, the specific primitive operations are encode sparse data, calculate indices, multiply pairs, and scatter-add. One or more instructions may be used to perform each of the primitive operations.

In one embodiment, the encode sparse data operation is executed using a single instruction having a single operand. A single operand is a vector of scalar values S. The operand is sparse, having one or more values that are equal to zero. In one embodiment, the operand is a vector of activation values. The encode sparse data instruction outputs a vector of non-zero elements A and a vector of encoded indices AX. The encoded indices represent positions associated with the non-zero elements. In one embodiment, each encoded index corresponds to a non-zero element and specifies a number of zeros preceding the corresponding non-zero element. For example, a compressed-space encoding of the data shown in FIG. 3B is (a, b, c, d, e, f) and (2, 0, 3, 4, 1, 1) representing a vector of non-zero elements and a corresponding vector of encoded indices.

In one embodiment, the encode sparse data instruction is executed iteratively to remove all of the zeros from the operand and generate the vector of non-zero elements A and a vector of encoded indices AX. Depending on the number of non-zero values in the operand, each iteration of the encode sparse data instruction may or may not fill an output word, or the output word may overflow. Therefore, in one embodiment, two output words are provided as the vector of non-zero elements A, and a conditional test is used to determine when each output word should be stored to provide the result A.

In one embodiment, the input to the instruction is a 64-bit register I with each byte encoding a value, and a second register IX that gives the direct index of the first position in register I. For example, I=[0, 0, 3, 0, 4, 5, 0, 0] and IX=32, where 32 is the direct index of the first 0 in register I and 32+2=34 is the direct index of the first non-zero value in register I. The output values are accumulated in registers A and B, and the output indices are in registers AX and BX. The registers AX and BX are encoded using direct indexing. A count of valid outputs is in register G. Continuing the example, suppose that before instruction execution A=[1, 2, 3, 1, 2, 7, 0, 0], AX=[8, 11, 12, 15, 17, 19, 0, 0], B=BX=0, and G=6. After executing the instruction the three new non-zeros in register I are added to the six in register A—overflowing to register B and the resulting output registers are: A=[1, 2, 3, 1, 2, 7, 3, 4], B=[5, 0, 0, 0, 0, 0, 0, 0] AX=[8, 11, 12, 15, 17, 19, 34, 36], BX=[37, 0, 0, 0, 0, 0, 0, 0], and G=9. A test for G>=8 can be used to decide to output A and AX.

The encode sparse data instruction may be used to generated encoded sparse activation and/or weight values. The vector of encoded indices AX may be provided as an input to the calculate index operation and the vector of non-zero elements A may be provided as an input to the multiply pairs operation. The encoded indices AX may be represented in the format described in conjunction with FIG. 4C or 4E. For example, a 4-bit encoded index (i.e., code) may indicate a coordinate type (e.g., R, S, K, X, and Y) and zero-count value for each non-zero element. Alternatively, the encoded indices AX may be represented in the format described in conjunction with FIG. 5A, 5B, 5C, 5D, or 5E. For example, one or more encoded indices may specify one of (i) add z+1 to the last coordinate, wrapping in r, s, and/or k as appropriate (r=r+z+1, wrap), (ii) skip to the next row (s=s+1, x=z, wrap), or (iii) skip to the next channel (k=k+1, s=0, r=z, wrap).

In one embodiment, the calculate index operation performs step 120 of the method 100 shown in FIG. 1. In one embodiment, the calculate index operation decompresses encoded sparse weight and activation indices into r, s, and k coordinates and x and y coordinates, respectively, and uses the coordinates to calculate linear addresses for input to the scatter-add operation. The calculate index operation is executed using a single instruction having two operands, both of which are encoded indices. The calculate index operation generates an output set of linear addresses, where the number of linear addresses is the product of the sizes of the inputs to an associated multiply pairs operation (e.g., P=F*I). For example, the calculate index operation generates an output vector of 16 linear addresses from two 4-vector encoded indices.

In one embodiment, a first operand of the two operands is a vector of encoded indices associated with three-dimensional array (e.g., a weight kernel), where each position in the array is specified by position coordinates (r,s,k). In one embodiment, a second operand of the two operands is a vector of encoded indices associated with two-dimensional array (e.g., an array of activations), where each position in the array is specified by position coordinates (x,y).

In one embodiment, the calculate index instruction is used to decode a vector of encoded weight indices into r,s,k coordinates, decode a vector of encoded activation indices into x,y coordinates, sum all pairs of the corresponding coordinates to generate the output activation coordinates x,y,k, and convert the output coordinates to a set of linear addresses p[t].a for each product p[t] for use by the scatter-add instruction, where t is defined in TABLE 5. The encoded indices AX may be represented in the format described in conjunction with FIG. 4C and decoded as described in conjunction with TABLE 12. Alternatively, the encoded indices AX may be represented in the format described in conjunction with FIG. 5A, 5B, 5C, 5D, or 5E and decoded and described in conjunction with FIGS. 4F and 4G to produce position coordinates.

For example, assuming positions of non-zero weight values for two channels of 3×3 kernels, shown in FIG. 3B, are represented as encoded indices 2,0,3,4,1,1. The calculate index instruction expands the encoded indices to (r,s,k) coordinates (2,0,0), (0,1,0), (1,2,0), (0,1,1), (2,1,1), (1,2,1). Assuming that the (r,s,k) coordinates are combined with (x,y) coordinates (7,3), (12,3), (20,3), and (24,3) obtained by decoding encoded indices for non-zero activations. The respective coordinate pairs are summed to produce output positions defined by (x,y,k) coordinates (9,3,0), (14,3,0), (22,3,0), and (26,3,0) for the first four sets of (r,s,k) coordinates. The output position may converted into a linear address p[t].a according to the formula shown in Equation (1). The output position coordinates are converted into 105, 110, 118, and 122, assuming an output tile has a max_x_oa=32.

Figure 9A:
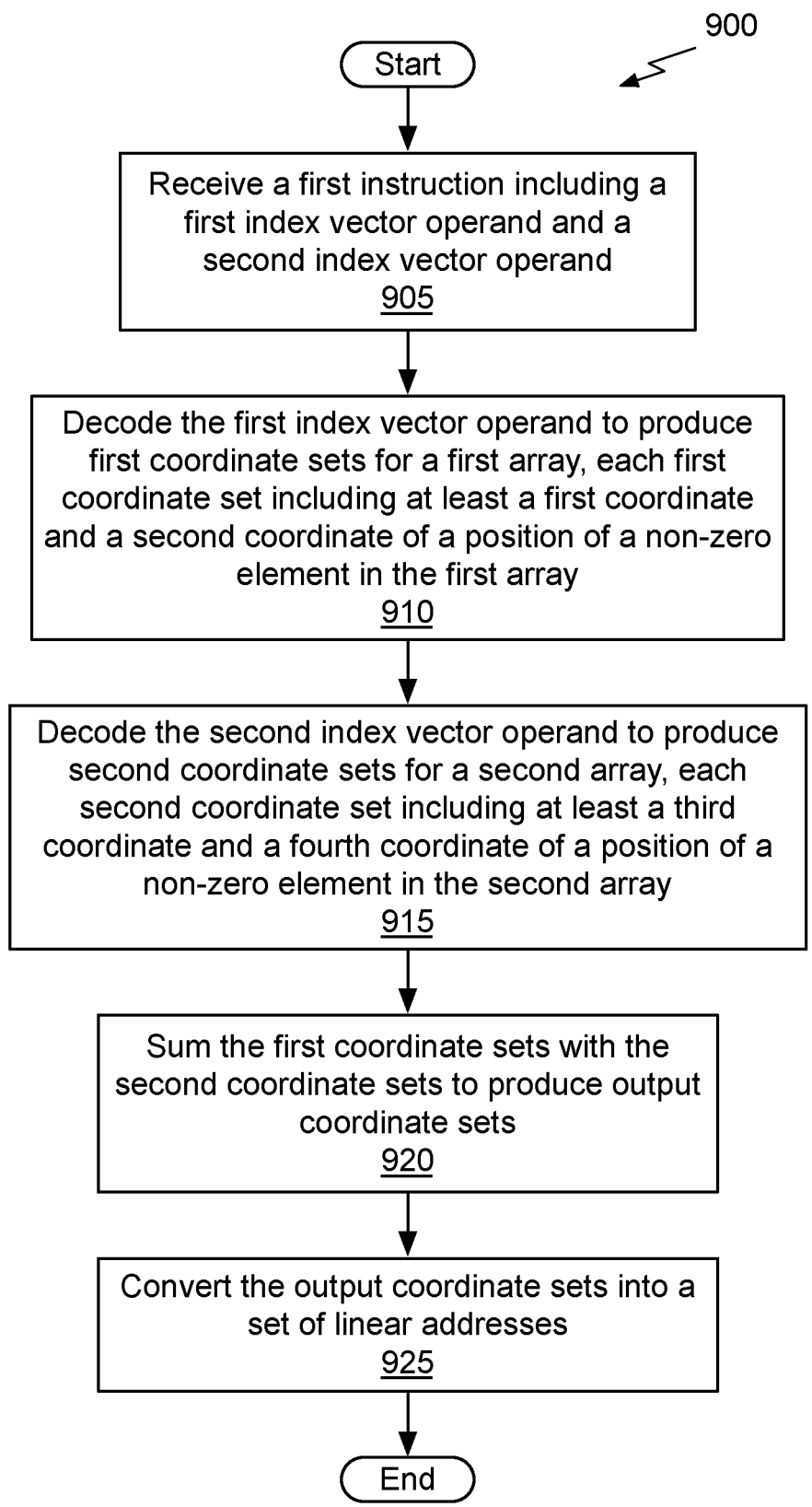
FIG. 9A illustrates a flowchart of a method for executing a calculate index instruction, in accordance with one embodiment.

FIG. 9A illustrates a flowchart of a method 900 for executing the calculate index instruction, in accordance with one embodiment. Although method 900 is described in the context of a GPC 650 within the PPU 600, the method 900 may also be performed by the SCNN accelerator 200, a program, custom circuitry, or by a combination of custom circuitry and a program. Furthermore, persons of ordinary skill in the art will understand that any system that performs method 900 is within the scope and spirit of embodiments of the present invention.

At step 905, the scheduler unit 810 in an SM 740 receives a first instruction including a first index vector operand and a second index vector operand. In one embodiment, the first instruction is a calculate index instruction. In one embodiment, the first index vector operand and the second index vector operand are indices for non-zero weight and activation values, respectively, that are encoded in a compressed-sparse format. At step 910, the scheduler unit 810 decodes the first index vector operand to produce first coordinate sets for a first array, each first coordinate set including at least a first coordinate and a second coordinate of a position of a non-zero value in the first array. In one embodiment the first coordinates sets are (r,s,k) coordinates of positions within a kernel (i.e., array or matrix) of weight values.

At step 915, the scheduler unit 810 decodes the second index vector operand to produce second coordinate sets for a second array, each second coordinate set including at least a third coordinate and a fourth coordinate of a position of a non-zero value in the second array. In one embodiment the first coordinates sets are (x,y) coordinates of positions within a two-dimensional array of activation values. When the tiles are large, the activations may be encoded as one-dimensional sparse vectors and each row of an activation tile may be encoded as a separate one-dimensional sparse vector. However, in later stages of CNNs and DNNs, where an entire activation channel is 13×13 (and tiles may be smaller) two-dimensional arrays of activations may be used for efficiency.

At step 920, the SFUs 852 or cores 850 sum the first coordinate sets with the second coordinate sets to produce output coordinate sets. In one embodiment, pairs of the r and x coordinates are summed, pairs of the s and y coordinates are summed, and the k coordinates are passed unchanged to produce (x,y,k) output coordinate sets. At step 920, the SFUs 852 or cores 850 convert the output coordinate sets into a set of linear indices. In one embodiment, the set of linear indices are then stored in the register file 820 or the shared memory/L1 cache 870.

In one embodiment, the multiply pairs operation performs step 115 of the method 100 shown in FIG. 1. The multiply pairs instruction takes two input operands that are each a vector of non-zero elements. In one embodiment each vector of non-zero elements includes 8 8-bit values or 4 16-bit values packed in a 64-bit word. The multiply pairs instruction produces an output product vector including the products of each non-zero element in a first vector non-zero elements and every non-zero element in a second vector of non-zero elements. For example, if the input vectors are a,b,c,d and p,q,r,s respectively, the output is a 16-vector with values a*p, a*q, a*r, a*s, b*p, b*q, b*r, b*s, c*p, c*q, c*r, c*s, d*p, d*q, d*r, and d*s. In one embodiment, the output product vector is computed by the SFUs 852 or cores 850 and stored in the register file 820 or the shared memory/L1 cache 870.

In one embodiment, the scatter-add operation performs step 125 of the method 100 shown in FIG. 1. In one embodiment, the scatter-add operation is executed using a single instruction having two operands. A first operand encodes a set of linear addresses p[t].a. A second operand encodes a set of scalar values s[*]. The scatter-add instruction adds the scalar values to partial sums at array locations that are identified by the linear addresses. In one embodiment, the first operand is the set of linear addresses generated by the calculate index instruction and the second operand is the output product vector generated by the multiply pairs instruction. Pseudo-code for the scatter-add operation is shown in TABLE 13.

TABLE 13

| Scatter-add operation |
| --- |
| forall j = 0:n−1<br>   A[i[j]] = A[i[j]] + s[j] ; |

In one embodiment, the array is stored in the shared memory/L1 cache 870 and the LSUs 854 read the partial from the array using the set of linear addresses. The SFUs 852 or cores 850 then add the scalar values to the partial sums and store the partial sums in the register file 820 or the shared memory/L1 cache 870.

Variations of the scatter-add instruction may support different widths of arguments and different targets (e.g., arrays and matrices). For inference, the scalars may be 8 8-bit (integer) values or 4 16-bit (integer or high-precision floating-point) values packed in a 64-bit word. In one embodiment, the indices are 16-bits packed in a 128-bit or 64-bit word, respectively. In one embodiment, the targeted array may be stored in the L2 cache 760, the memory 604, the shared memory/L1 cache 870, the register file 820, or in a dedicated accumulator memory.

The three instructions (encode sparse data instruction, calculate index instruction, multiply pairs instruction, and scatter-add instruction) may be used to implement a CNN or DNN. Pseudo-code for the inner loop of a sparse CNN implementation is shown in TABLE 14. The encode sparse data instruction may occur much earlier in a program and is not shown in TABLE 14.

TABLE 14

| Scatter-add operation |
| --- |
| For each input activation vector A,AX in channel c<br>  // A holds the non-zero values<br>  // AX holds the encoded indices<br>  For each weight W,WX in channel c and output channel chunk KN<br>    // W holds the values, WX the encoded indices<br>    P = MultiplyPairs(W,A)<br>    X = CalculateIndices(WX,AX)<br>    ScatterAdd(P,X) |

When 8-bit values are used, A, AX, W, and WX are all 8-vectors (per lane). The product vector P, and the index vector X are 64-vectors (per lane)—reflecting all pairs from the 8-vector inputs.

Figure 9B:
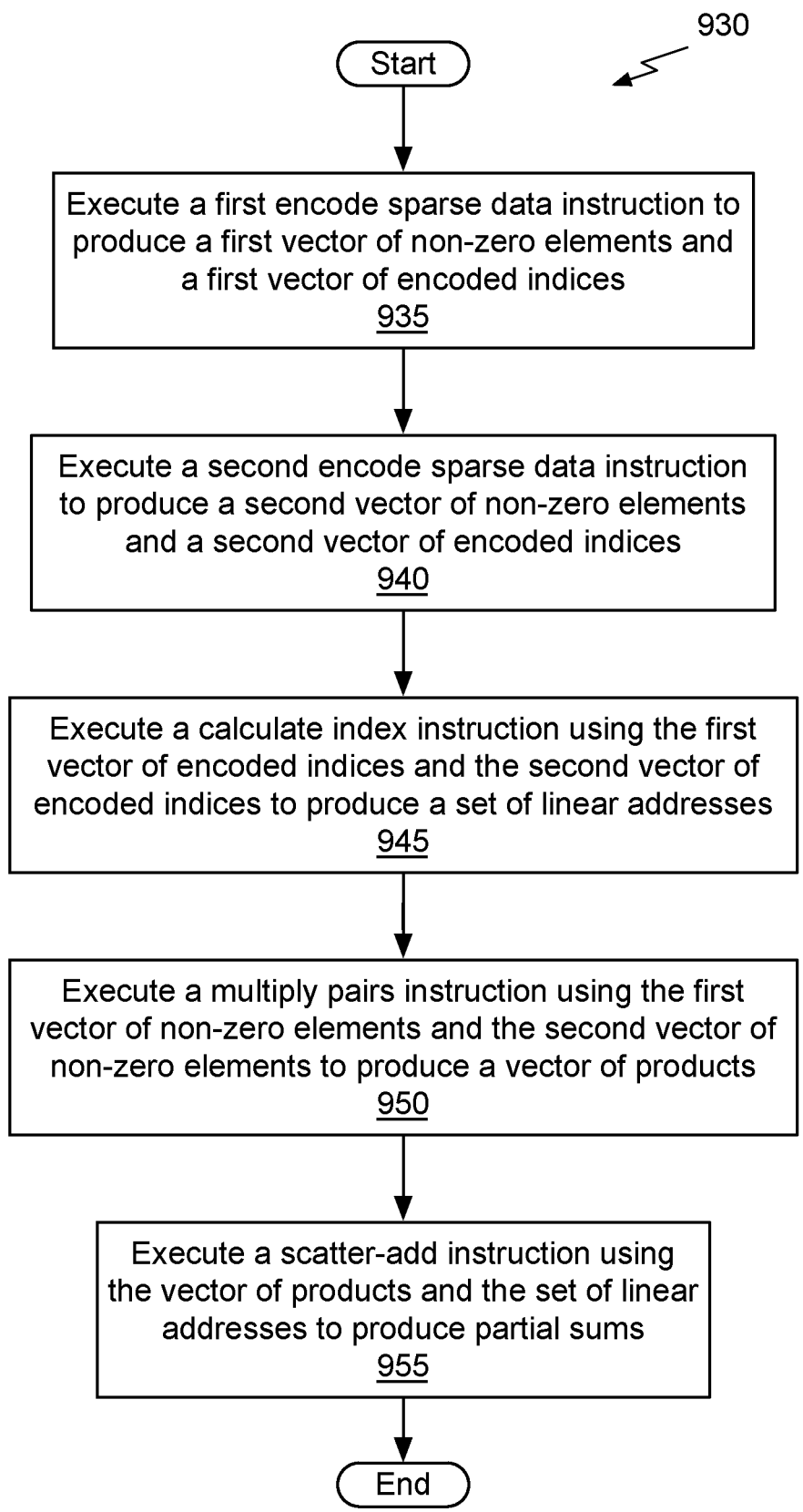
FIG. 9B illustrates a flowchart of a method for implementing a sparse CNN operation, in accordance with one embodiment.

FIG. 9B illustrates a flowchart of a method 930 for implementing a sparse CNN operation, in accordance with one embodiment. Although method 930 is described in the context of a GPC 650 within the PPU 600, the method 930 may also be performed by the SCNN accelerator 200, a program, custom circuitry, or by a combination of custom circuitry and a program. Furthermore, persons of ordinary skill in the art will understand that any system that performs method 930 is within the scope and spirit of embodiments of the present invention.

At step 935, the scheduler unit 810 in an SM 740 receives a first encode sparse data instruction including a single operand. The single operand may be an array of activation or weight values. The SFUs 852 or cores 850 generate a first vector of the non-zero elements in the array and encode the positions of each non-zero element as a first vector of encoded indices to complete execution of the first encode sparse data instruction.

At step 940, the scheduler unit 810 receives a second encode sparse data instruction including a single operand. The single operand may be an array of activation or weight values. The SFUs 852 or cores 850 generate a second vector of the non-zero elements in the array and encode the positions of each non-zero element as a second vector of encoded indices to complete execution of the second encode sparse data instruction.

At step 945, the scheduler unit 810 receives a calculate index instruction having the first vector of encoded indices and the second vector of encoded indices as the first index vector operand and a second index vector operand, respectively. Step 945 the method 900 is completed to execute the calculate index instruction and produce a set of linear addresses.

At step 950, the scheduler unit 810 receives a multiply pairs instruction with the first vector of non-zero elements and the second vector of non-zero elements as input operands. The SFUs 852 or cores 850 produce the vector of products that includes products of each non-zero element in the first vector of non-zero elements and every non-zero element in the second vector of non-zero elements to complete execution of the multiply pairs instruction.

At step 955, the scheduler unit 810 receives a scatter-add instruction with the vector of products and the set of linear addresses as input operands. The SFUs 852 or cores 850 produce the partial sums by adding the products to partial sums at array locations that are identified by the linear addresses to complete execution of the scatter-add instruction.

Exemplary System

Figure 10:
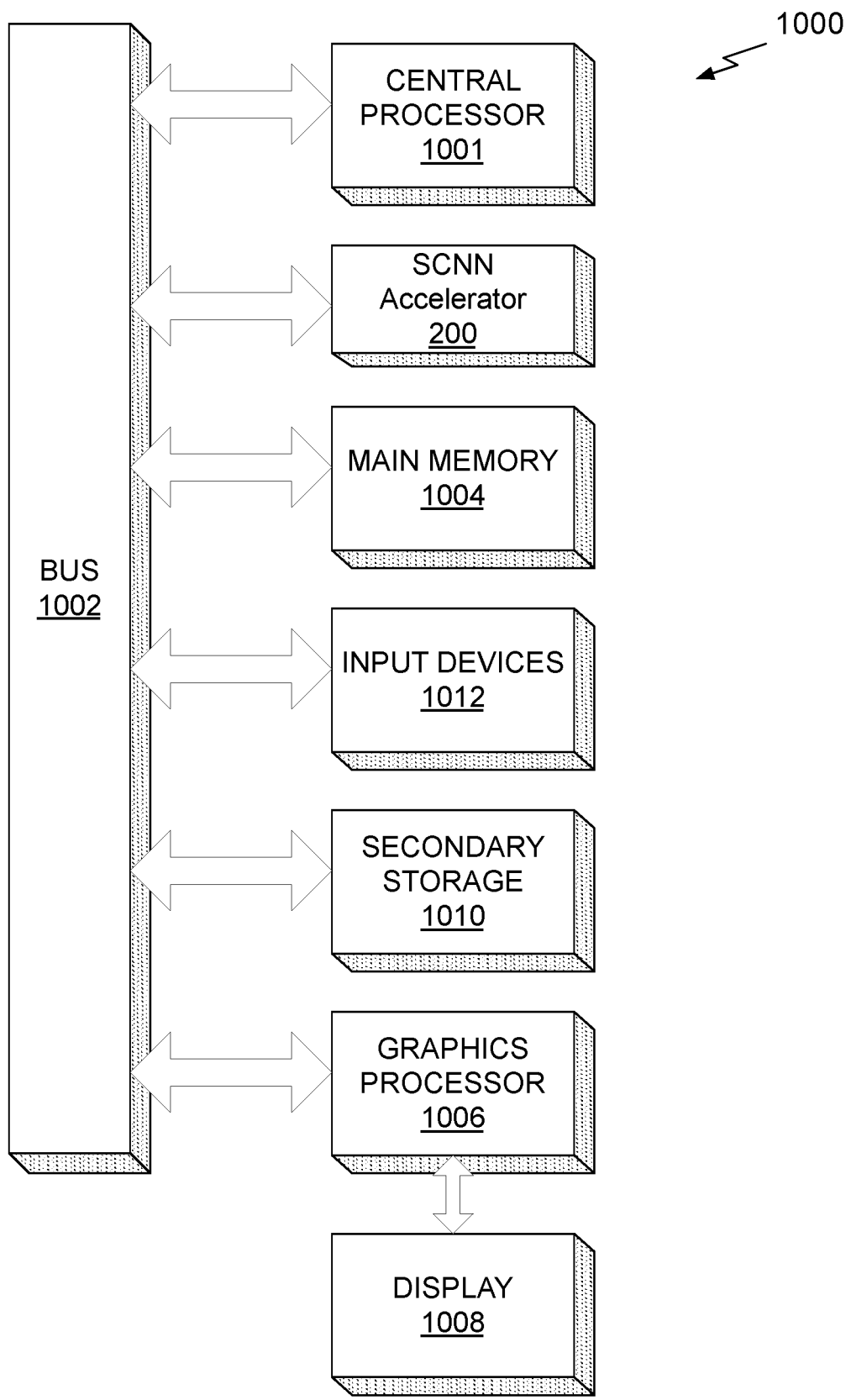
FIG. 10 illustrates an exemplary system in which the various architecture and/or functionality of the various previous embodiments may be implemented.

FIG. 10 illustrates an exemplary system 1000 in which the various architecture and/or functionality of the various previous embodiments may be implemented. As shown, a system 1000 is provided including at least one SCNN Accelerator 200 that is connected to a communication bus 1002. The communication bus 1002 may be implemented using any suitable protocol, such as PCI (Peripheral Component Interconnect), PCI-Express, AGP (Accelerated Graphics Port), HyperTransport, or any other bus or point-to-point communication protocol(s). The system 1000 also includes a main memory 1004. Control logic (software) and data are stored in the main memory 1004 which may take the form of random access memory (RAM).

The system 1000 also includes a central processor 1001 (e.g., CPU), input devices 1012, a graphics processor 1006, and a display 1008, i.e. a conventional CRT (cathode ray tube), LCD (liquid crystal display), LED (light emitting diode), plasma display or the like. User input may be received from the input devices 1012, e.g., keyboard, mouse, touchpad, microphone, and the like. In one embodiment, the graphics processor 1006 may include a plurality of shader modules, a rasterization module, etc. Each of the foregoing modules may even be situated on a single semiconductor platform to form a graphics processing unit (GPU). The graphics processor 1006 may be configured to execute one or more of the encode sparse data instruction, calculate index instruction, multiply pairs instruction, and scatter-add instruction.

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional CPU and bus implementation. Of course, the various modules may also be situated separately or in various combinations of semiconductor platforms per the desires of the user.

The system 1000 may also include a secondary storage 1010. The secondary storage 1010 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, input data for the SCNN Accelerator 200, output data generated by the SCNN Accelerator 200, and the like may be stored in the main memory 1004 and/or the secondary storage 1010. Such computer programs, when executed, enable the system 1000 to perform various functions. The memory 1004, the storage 1010, and/or any other storage are possible examples of computer-readable media.

In one embodiment, the architecture and/or functionality of the various previous figures may be implemented in the context of the SCNN Accelerator 200, central processor 1001, the graphics processor 1006, an integrated circuit (not shown) that is capable of at least a portion of the capabilities of one or more of the SCNN Accelerator 200, the central processor 1001, and the graphics processor 1006, a chipset (i.e., a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 1000 may take the form of a desktop computer, laptop computer, server, workstation, game consoles, embedded system, and/or any other type of logic. Still yet, the system 1000 may take the form of various other devices including, but not limited to a personal digital assistant (PDA) device, a mobile phone device, a television, etc.

Further, while not shown, the system 1000 may be coupled to a network (e.g., a telecommunications network, local area network (LAN), wireless network, wide area network (WAN) such as the Internet, peer-to-peer network, cable network, or the like) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
receiving, by a parallel processing unit, a first instruction including a first index vector operand and a second index vector operand;
decoding, by the parallel processing unit, the first index vector operand to produce first coordinate sets for a first array, each first coordinate set including at least a first coordinate and a second coordinate of a position of a non-zero element in the first array;
decoding, by the parallel processing unit, the second index vector operand to produce second coordinate sets for a second array, each second coordinate set including at least a third coordinate and a fourth coordinate of a position of a non-zero element in the second array;
summing, by the parallel processing unit, the first coordinate sets with the second coordinate sets to produce output coordinate sets; and
converting, by the parallel processing unit, the output coordinate sets into a set of linear indices.

2. The method of claim 1, wherein the summing comprises summing each first coordinate in the first coordinate sets with a third coordinate in the second coordinate sets to produce the coordinates of the output coordinate sets.

3. The method of claim 1, wherein the first array is a three-dimensional array and the second array is a two-dimensional array.

4. The method of claim 1, wherein the first array stores weight values and the second array stores activation values.

5. The method of claim 1, wherein the first index vector encodes values that are accumulated in sequence to compute the first coordinates for each non-zero element in the first array.

6. The method of claim 1, further comprising:
receiving, by the parallel processing unit, a second instruction including a first set of linear addresses operand and a second scalar values operand; and
summing, by the parallel processing unit, scalar values in the scalar values operand to values in a third array, each value in the third array corresponding to a linear address in the first set of linear addresses operand.

7. The method of claim 6, wherein the first indices operand is the set of linear indices.

8. The method of claim 1, further comprising:
receiving a second instruction including a first non-zero elements vector operand and a second non-zero elements vector operand; and
multiplying each one of the non-zero elements in the first non-zero values vector operand by every one of the non-zero elements in the second non-zero elements vector operand to produce a vector of products.

9. The method of claim 8, wherein each of the non-zero elements in the first non-zero elements vector operand corresponds to an index in the first index vector operand and each of the non-zero elements in the second non-zero values vector operand corresponds to an index in the second index vector operand.

10. The method of claim 8, further comprising:
receiving, by the parallel processing unit, a third instruction including a first set of linear addresses operand and a second scalar values operand, wherein the first set of linear addresses operand is the set of linear addresses and the second scalar values operand is the vector of products; and
summing, by the parallel processing unit, scalar values in the scalar values operand with partial sums in a third array, each partial sum in the third array corresponding to a linear address in the first set of linear addresses operand.

11. The method of claim 1, further comprising, before receiving the first instruction:
receiving, by the parallel processing unit, a second instruction including a first scalar values operand;
generating a vector of non-zero elements including only values in the first scalar values operand that are not equal to zero; and
generating a vector of indices comprising positions within the second array, wherein each index in the vector of indices is associated with a non-zero element in the vector of non-zero elements.

12. The method of claim 11, wherein the second indices operand is the vector of indices.

13. A processor, comprising:
parallel processing units configured to:
receive a first instruction including a first index vector operand and a second index vector operand;
decode the first index vector operand to produce first coordinate sets for a first array, each first coordinate set including at least a first coordinate and a second coordinate of a position of a non-zero element in the first array;
decode the second index vector operand to produce second coordinate sets for a second array, each second coordinate set including at least the first coordinate and the second coordinate of a position of a non-zero element in the second array;
sum the first coordinate sets with the second coordinate sets to produce output coordinate sets; and
convert the output coordinate sets into a set of linear indices.

14. The processor of claim 13, wherein the parallel processing units are further configured to sum each first coordinate in the first coordinate sets with a third coordinate in the second coordinate sets to produce the coordinates of the output coordinate sets.

15. The processor of claim 13, wherein the first index vector encodes values that are accumulated in sequence to compute the first coordinates for each non-zero element in the first array.

16. The processor of claim 13, the parallel processing units are further configured to:
receive a second instruction including a first set of linear addresses operand and a second scalar values operand; and
sum scalar values in the scalar values operand to values in a third array, each value in the third array corresponding to a linear address in the first set of linear addresses operand.

17. The processor of claim 16, wherein the first indices operand is the set of linear indices.

18. The processor of claim 13, the parallel processing units are further configured to:
receive a second instruction including a first non-zero elements vector operand and a second non-zero elements vector operand; and
multiply each one of the non-zero elements in the first non-zero values vector operand by every one of the non-zero elements in the second non-zero elements vector operand to produce a vector of products.

19. The processor of claim 13, the parallel processing units are further configured to, before receiving the first instruction:
   receive a second instruction including a first scalar values operand;
   generate a vector of non-zero elements including only values in the first scalar values operand that are not equal to zero; and
   generate a vector of indices comprising positions within the second array, wherein each index in the vector of indices is associated with a non-zero element in the vector of non-zero elements.

20. A non-transitory, computer-readable storage medium storing instructions that, when executed by a processor, cause the processor to perform steps comprising:
   receiving a first instruction including a first index vector operand and a second index vector operand;
   decoding the first index vector operand to produce first coordinate sets for a first array, each first coordinate set including at least a first coordinate and a second coordinate of a position of a non-zero element in the first array;
   decoding the second index vector operand to produce second coordinate sets for a second array, each second coordinate set including at least the first coordinate and the second coordinate of a position of a non-zero element in the second array;
   summing the first coordinate sets with the second coordinate sets to produce output coordinate sets; and
   converting the output coordinate sets into a set of linear indices.

* * * * *